US007200804B1

(12) United States Patent
Khavari et al.

(10) Patent No.: US 7,200,804 B1
(45) Date of Patent: Apr. 3, 2007

(54) METHOD AND APPARATUS FOR PROVIDING AUTOMATION TO AN INTERNET NAVIGATION APPLICATION

(75) Inventors: Sam Khavari, Redwood City, CA (US); Tim Armandpour, Redwood City, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 802 days.

(21) Appl. No.: 09/653,908

(22) Filed: Sep. 1, 2000

Related U.S. Application Data

(63) Continuation-in-part of application No. 09/629,492, filed on Jul. 31, 2000, which is a continuation-in-part of application No. 09/550,348, filed on Apr. 14, 2000, which is a continuation-in-part of application No. 09/532,647, filed on Mar. 22, 2000, which is a continuation-in-part of application No. 09/323,598, filed on Jun. 1, 1999, which is a continuation-in-part of application No. 09/208,740, filed on Dec. 8, 1998.

(51) Int. Cl.
*G06F 17/00* (2006.01)

(52) U.S. Cl. ............... 715/513; 715/500.1; 715/501.1; 715/704

(58) Field of Classification Search ............... 709/219, 709/203, 204, 217, 227, 224; 345/732; 714/46; 715/500.1, 513, 732, 526, 501.1, 704; 707/10
See application file for complete search history.

(56) References Cited

U.S. PATENT DOCUMENTS 5,717,860 A * 2/1998 Graber et al. ............... 709/227

| 5,809,247 | A | * | 9/1998 | Richardson et al. | ........ 709/218 |
| 5,809,250 | A | * | 9/1998 | Kisor | ......... 709/227 |
| 5,951,643 | A | * | 9/1999 | Shelton et al. | ............. 709/227 |
| 5,982,370 | A | * | 11/1999 | Kamper | ..................... 345/760 |
| 6,008,807 | A | * | 12/1999 | Bretschneider et al. | ..... 345/732 |
| 6,009,429 | A | * | 12/1999 | Greer et al. | .................. 707/10 |
| 6,029,182 | A | * | 2/2000 | Nehab et al. | ............... 715/523 |
| 6,084,582 | A | * | 7/2000 | Qureshi et al. | ........... 715/500.1 |
| 6,088,717 | A | * | 7/2000 | Reed et al. | .................. 709/201 |

(Continued)

OTHER PUBLICATIONS

Sastry et al, Webtour: a system to record and playback dynamic multimedia annotations on web document content, 1999, ACM.*

(Continued)

*Primary Examiner*—Doug Hutton
*Assistant Examiner*—James H. Blackwell
(74) *Attorney, Agent, or Firm*—Donald R. Boys; Central Coast Patent Agency, Inc.

(57) ABSTRACT

A software application for enabling creation and execution of an automated browser navigation sequence is provided. The software application comprises a session recording module for recording parameters associated with a manual navigation sequence, a file creation module for converting data of a manual session into data comprising an executable sequence of instructions for conducting an automated navigation sequence, and an application-program-interface module for integrating a functional capability with the automated navigation sequence. The automated navigation sequence is characterized in that a completely automated browser-navigation sequence performed by the browser application is enabled through execution of the executable instruction sequence created from the recorded parameters of the manual navigation sequence.

12 Claims, 23 Drawing Sheets

U.S. PATENT DOCUMENTS

| | | | |
|---|---|---|---|
| 6,096,096 A * | 8/2000 | Murphy et al. | 717/175 |
| 6,122,647 A * | 9/2000 | Horowitz et al. | 715/513 |
| 6,144,375 A * | 11/2000 | Jain et al. | 715/500.1 |
| 6,163,779 A * | 12/2000 | Mantha et al. | 707/100 |
| 6,182,072 B1 * | 1/2001 | Leak et al. | 707/10 |
| 6,189,024 B1 * | 2/2001 | Bauersfeld et al. | 709/203 |
| 6,195,679 B1 * | 2/2001 | Bauersfeld et al. | 709/203 |
| 6,199,077 B1 * | 3/2001 | Inala et al. | 715/501.1 |
| 6,199,079 B1 * | 3/2001 | Gupta et al. | 715/507 |
| 6,223,215 B1 * | 4/2001 | Hunt et al. | 709/217 |
| 6,230,168 B1 * | 5/2001 | Unger et al. | 715/501.1 |
| 6,237,030 B1 * | 5/2001 | Adams et al. | 709/218 |
| 6,286,033 B1 * | 9/2001 | Kishinsky et al. | 709/203 |
| 6,286,046 B1 * | 9/2001 | Bryant | 709/224 |
| 6,288,716 B1 * | 9/2001 | Humpleman et al. | 709/203 |
| 6,292,186 B1 * | 9/2001 | Lehman et al. | 715/705 |
| 6,418,471 B1 * | 7/2002 | Shelton et al. | 709/227 |
| 6,421,673 B1 * | 7/2002 | Caldwell et al. | 707/10 |
| 6,490,564 B1 * | 12/2002 | Dodrill et al. | 704/275 |
| 6,502,102 B1 * | 12/2002 | Haswell et al. | 707/102 |
| 6,510,461 B1 * | 1/2003 | Nielsen | 709/224 |
| 6,535,909 B1 * | 3/2003 | Rust | 709/204 |
| 6,535,912 B1 * | 3/2003 | Anupam et al. | 709/217 |
| 6,560,641 B1 * | 5/2003 | Powderly et al. | 709/219 |
| 6,572,662 B2 * | 6/2003 | Manohar et al. | 715/526 |
| 6,587,969 B1 * | 7/2003 | Weinberg et al. | 714/46 |
| 6,615,240 B1 * | 9/2003 | Sullivan et al. | 709/205 |
| 6,625,808 B1 * | 9/2003 | Tarditi | 717/154 |
| 6,629,087 B1 * | 9/2003 | Benson et al. | 706/11 |
| 6,631,345 B1 * | 10/2003 | Schumacher et al. | 703/22 |
| 6,701,514 B1 * | 3/2004 | Haswell et al. | 717/115 |
| 6,752,662 B2 * | 6/2004 | Okamoto | 439/607 |
| 6,907,546 B1 * | 6/2005 | Haswell et al. | 714/38 |
| 6,976,210 B1 * | 12/2005 | Silva et al. | 715/513 |
| 2001/0003828 A1 * | 6/2001 | Peterson et al. | 709/219 |
| 2002/0002571 A1 * | 1/2002 | Manohar et al. | 707/526 |
| 2002/0083132 A1 * | 6/2002 | Holland et al. | 709/203 |
| 2002/0186249 A1 * | 12/2002 | Lu et al. | 345/781 |
| 2004/0205176 A1 * | 10/2004 | Ting et al. | 709/223 |
| 2004/0230647 A1 * | 11/2004 | Rawat | 709/203 |

OTHER PUBLICATIONS

Marais, "Compaq's Web Language: A Programming Language for the Web", Compaq Systems Research Center (SRC), 1998-1999, whole document used as reference for WebL language.*

Anupam et al., "Automating Web Navigation with the WebVCR", Mar. 1, 2000, Bell Labs, pp. 2, 5-6, 10, 12-13.*

Safonov, "Web Macros by Example: Users Managing the WWW of Applications", May 15-20, 1999, CHI '99, used for background.*

Sugiura et al., "Internet Scrapbook: Automating Web Browsing Tasks by Demonstration", 1998, ACM, used for background.*

Krulwich, "Automating the Internet: Agents as User Surrogates", downloaded May 18, 2004 from http://www.computer.org/internet/v1n4/krul9707.htm, used for background.*

Bauer et al., "InfoBeans Configuration of Personalized Information Assistants", downloaded May 18, 2004 from http://www.dfki.de/~bauer/PAN/infobeans.html, used for background.*

Manohar et al., "The Session Capture and Replay Paradigm for Asynchronous Collaboration", Sep. 1995, Proceedings of the European Conference on Computer Supported Cooperative Work, Kluwer, pp. 149-164, Stockholm, Sweden, used for background.*

Borges et al., "A Fine Grained Heuristic to Capture Web Navigation Patterns", Jul. 2000, ACM, used for background.*

Safonov et al., "WebMacros—a Proxy-based System for Automating User Interactions with the Web", May 1-5, 2001, WWW10, used for background.*

"Internet Macros: A System and Method for Automation of Internet Activities", Nov. 1, 1999, IBM technical disclosure bulletin, NNRD42772, used for background.*

Mille-Frayling et al., MS WebScout: Web Navigation Aid and Personal Web History Explorer, www 2002, downloaded from http://www2002.org/CDROM/poster/170/index.html.*

Kant et al., "Web-R: a tool to record and replay personal web navigation", www 2003, downloaded from http://www2003.org/cdrom/papers/poster/p296/p296-kant.html.*

Unknown, "CruiseControl software product page", Ver. 1.1 (Aug. 2, 2002), Intellience, downloaded from http://www.intellience/com/products.php.*

Unknown, "Deskperience Web Replay software product page", Deskperience, downloaded from http://www.deskperience.com/webreplay/features.html.*

Unknown, "What's new ? page for TaskWare product WinTask", 2001, downloaded from http://www.archive.org/20010331145446/www.wintask.com/whatsnew.htm.*

Unknown, "WebHopper product page", downloaded from http://www.vilexsoft.com/.* author unknown,"TourMaker virtual field trip maker", Tramline.com, Copyright 1996-2004, pp. 1-3.*

Moody,"WebPath: Sharable Personalized Guided Web Tours", Copyright 1998, IBM 12 pages.*

Furuta et al.,"Hypertext Paths and the World-Wide Web: Experiences with Walden's Paths", Copyright 1997, ACM, 10 pages.*

Juhne et al.,"Ariadne: a Java-based guided tour system for the World Wide Web", Copyright 1998, Tele Danmark Internet, 11 pages.*

Manohar et al., "The Session Capture and Replay Paradigm for Asynchronous Collaboration", Copyright 1995, 16 pages.*

Sandvad et al.,"A Metro Map Metaphor for Guided Tours on the Web: the Webvise Guided Tour System", Copyright May 1-5, 2001, ACM, pp. 326-333.*

Pratik et al.,"Browsing Intricately Interconnected Paths", Copyright 2003, ACM, 9 pages.*

* cited by examiner

*Fig. 10 (NetworkOverview)*

Fig. 11 (SW Architecture)

METHOD AND APPARATUS FOR PROVIDING AUTOMATION TO AN INTERNET NAVIGATION APPLICATION

CROSS-REFERENCE TO RELATED DOCUMENTS

The present invention is a continuation in part (CIP) to a patent application Ser. No. 09/629,492, filed Jul. 31, 2000 entitled, "Software Bundle for Providing Automated Functionality to a WEB-Browser, which is a (CIP) to a patent application Ser. No. 09/550,348, filed Apr. 14, 2000, entitled "Method and Apparatus for Providing Auto-Registration and Service Access to Internet Sites for Internet Portal Subscribers", which is a CIP to patent application Ser. No. 09/532,647, filed Mar. 22, 2000 entitled "Method and Apparatus for Retrieving Information From Semi-Structured, WEB-Based Data Sources", which is a CIP of a patent application Ser. No. 09/323,598 entitled "Method and Apparatus for Obtaining and Presenting WEB Summaries to Users" filed on Jun. 1, 1999, which is a CIP to a patent application Ser. No. 09/208,740 entitled "Method and Apparatus for Providing and Maintaining a User-Interactive Portal System Accessible via Internet or other Switched-Packet-Network" filed on Dec. 8, 1998, all disclosures of which are incorporated herein in their entirety herein by reference.

FIELD OF THE INVENTION

The present invention is in the field of Internet navigation including various communication and connection technologies and pertains more particularly to methods and apparatus, including software, for providing automated functionality to a navigation application.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security that may vary from service to service. Additionally, many users at their own volition may choose different passwords for different sites so as to have increased security, which in fact also increases the number of passwords a user may have.

Another issue that can plague a user who has many passworded subscriptions is the fact that they must book-mark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in disclosure referenced by Ser. No. 09/208,740 listed under the cross-reference to related documents section provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URLs in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URLs for specific content if such pages are cached somewhere in their presentable form such as at the portal server, or on the client's machine.

A further enhancement to the system described above is known to the inventor and described in the disclosure of application Ser. No. 09/323,598 also listed under the cross-reference section. The described enhancement consists of a means for obtaining information from WEB-based sources using a site-navigation script, a field template, and a means for parsing data. The navigation script follows site logic of a target WEB site containing the data for return to a user. Part of the template includes the description and location of the data requested by a user. A parsing engine acts to identify the new data for retrieval for a user. In this way, WEB summaries may be compiled on updated data at user-frequented sites.

A further enhancement to the above system is known to the inventor and disclosed under the patent application listed in the cross-reference section as 09532,647 and entitled "Method and Apparatus for Retrieving Information From Semi-Structured, WEB-Based Data Sources".

In the enhancement described above, an Internet search system is structured for efficient data retrieval from semi-structured data sources. Using a text selection and configuration tool, a user is enabled to navigate to a WEB-site, or multiple WEB-sites, and pre-select the block areas of information that contain data that he or she wishes to be accessed and retrieved during future automated data searches. The data type entered by a provided data input function is associated with a WEB page block selected, and upon search implementation the block selected is searched for the data type requested, and data found is retrieved to be provided to the user. In a preferred embodiment portions of the system are executed on a user station, and other portions on a Portal server to which the user may subscribe. In this way, a user may have data retrieved from semi-structured sources and presented in the form of a summary page.

The Portal system with the above-described enhancements taught in the cross-referenced patent applications also features an automatic registration service available to users if they want information from a WEB-site or service that requires registration. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In disclosure taught thus far, auto registration is fairly limited to include only sites that are requested by a user and whom are cooperative to the procedure.

It has occurred to the inventor that the functions of auto-registration may be expanded to include a plurality of pre-configured WEB-services which are looking for new clients. Such a value-added service may provide researched and rated service sites that collectively provide all of the types of singular or multiple services that a Portal subscriber may need or desire.

Such a system is known to the inventor and referenced in the cross-reference section above. The system, referred to as a navigation sub-system provides a software function, which is part of the system as a whole, for populating and submitting electronic forms by proxy over a data-packet-network. The system comprises a software application running on a system of network-connected servers that enables a user, connected in session with one of the servers, to navigate to a site containing an electronic form and obtain data about the site and about the form. The data obtained is used in conjunction with data about the user to construct a machine-readable job order upon user request that may be executed for the purpose of automatic form population and submission to a host sponsoring the site. Upon acceptance of the submitted form, data used for passwords, log-in codes and user-names is returned to a data repository where it is entered along with specific site data as a new registered site item for a registering user such that future navigation to the site, auto log-in and data return may be performed automatically on behalf of the user.

In order to provide fully automated proxy services on behalf of users, a software bundle including an auto-control mechanism must be conceived and implemented for the purpose of enabling true automation of java-based programs executed by a proxy browsing application without the need for user intervention. It is an object of the present invention to provide a truly automated and self-contained navigation system for performing by proxy all of the functions that normally require user input to accomplish.

A software application known to the inventor and described in one of the patent applications listed under the Cross-Reference to Related Documents section above, provides a software-bundle for enabling automated navigating and task-performance extension on a data network on behalf of a user by proxy. The software bundle comprises a browser application, for navigating on the network; a set of functional programs for performing tasks; a set of APIs for integrating the functional programs to the browser application and a control application. The control application functions to operate the software bundle including, spawning, managing and terminating an instance of the browser application and monitoring behavior of the browser instance during a navigation sequence. The software-bundle, including the browser application, functions as a fully automated navigation system capable of performing all of the functions of a manual navigation system controlled by a user having a data-input system for controlling the navigation system.

It has occurred to the inventor that, independent of the functionality that the above-described software-bundle provides, a similar function could be added to a PC user's desktop wherein navigation to, logging on to a specific website, and performing tasks at the site could be automated. Such a task could be accomplished with no user interaction after the initial set up. In prior art, users operating desktop browsers must perform many input actions in order to manage network navigation tasks. Moreover, filling in electronic forms for authentication, purchasing, registration, and the like require still more input action by a user in session.

What is clearly needed, and provided by the present invention, is a method and apparatus for enabling at least a limited capability for automating a desktop browser application to perform navigation and interaction sequences on behalf of a user wherein manual input required by the user is significantly reduced, and in some cases, eliminated.

SUMMARY OF THE INVENTION

In a preferred embodiment of the present invention, a software application for enabling creation and execution of an automated browser navigation sequence is provided. The software application comprises a session recording module for recording parameters associated with a manual navigation sequence, a file creation module for converting data of a manual session into data comprising an executable sequence of instructions for conducting an automated navigation sequence, and an application-program-interface module for integrating a functional capability with the automated navigation sequence. The automated navigation sequence is characterized in that a completely automated browser-navigation sequence performed by the browser application is enabled through execution of the executable instruction sequence created from the recorded parameters of the manual navigation sequence.

In a preferred embodiment, the automated browser-navigation sequence is executed to run on a data-packet-network, which in a preferred application is the Internet network. In a preferred aspect, the file-creation module includes a function for creating an icon for launching the automated browser-navigation sequence. In the same aspect, the sequence of instructions also termed an executable instruction file is executable and launches a navigation sequence upon activation. In one embodiment, the executable sequence of instructions is created using Extensible-Markup-Language (XML). In still another aspect, the automated-navigation sequence enables automation of one or more of form-population, data-downloading, media-interaction, data-searching, hyper-linking. In all aspects, the application is in one implementation part a browser plug-in, in another implementation a standalone application, both of which contain a user-configuration tool.

The automated navigation-sequence is created, in some embodiments, as a result of manual user programming as an alternative option to recording a manual sequence. In one embodiment, the automated navigation-sequence also includes an embedded request for one or more proxy services to be performed by a service provider operating on and accessible via the Internet network. In this embodiment, the embedded request is automatically sent to the service provider during execution and performance of an automated navigation sequence. The embedded request is received by virtue of an opened communication channel established between communicating navigation applications while the sending application is performing an automated navigation sequence.

In another aspect of the present invention, a method for creating an executable instruction for enabling an automated navigation sequence to be performed on a data-packet-network using a browser application is provided. The method comprises the steps of, (a) invoking the browser application and connecting to the network, (b) invoking and activating a session-recording module for recording a manual navigation sequence, (c) performing a desired manual navigation sequence, the sequence recorded by the recording function, (d) activating a stop-record function to define the end of the manual sequence and, (e) converting the recorded manual sequence into the executable instruction enabling the automated sequence, the conversion performed by software.

In a preferred embodiment in step (a), the data-packet-network is the Internet network and in step (e), the software converting data from the recorded session into the executable instruction prompts a user to name the executable instruction and to name an icon created and associated with instruction. In an enhanced embodiment, a step is added for prompting the user with a list of options to add proxy services to the executable instruction.

In a preferred application, the executable instruction is an XML template. In one aspect of the method, the executable instruction contains data personal to the user. In this aspect, the personal data includes one or a combination of user names, passwords, credit card numbers, user location information, and Social Security information. In a preferred application, the personal data remains encrypted until use. In another embodiment, the personal data remains in a secure location and is called into use by a navigation sequence executing and having a pointer to the accessed information embedded therein.

Now, for the first time a method and apparatus for enabling at least a limited capability for automating a desktop browser application to perform navigation and interaction sequences on behalf of a user is provided. The method and apparatus is such that manual input required by the user is significantly reduced, and in some cases, eliminated.

BRIEF DESCRIPTION OF THE DRAWING FIGURES

Figure 21B:
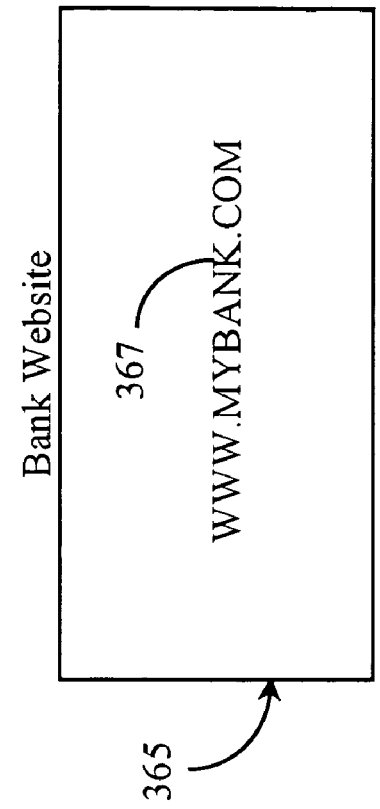
Figure 21D:
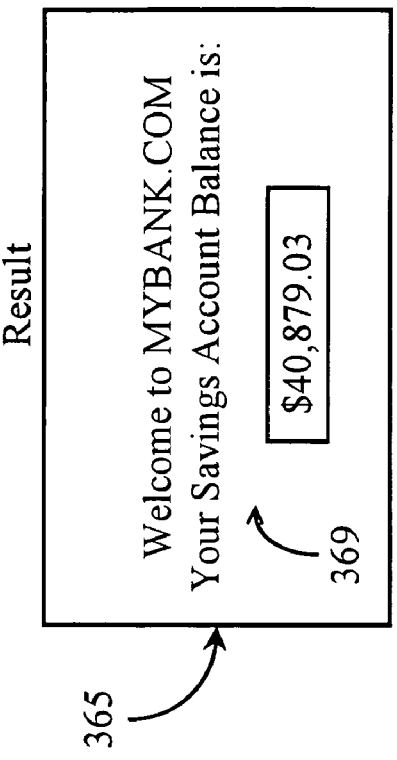
Figure 21A:
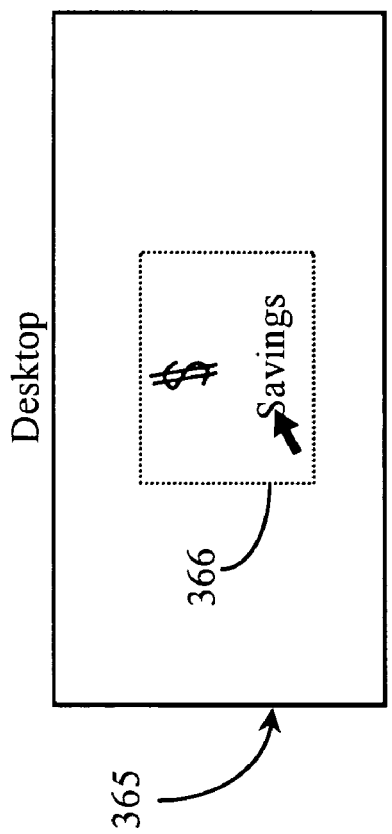

FIG. 21a block diagram illustrating a user-interface engaged in display of an interactive icon.

FIG. 21b is a block diagram illustrating the user-interface of FIG. 21a displaying a Web address.

Figure 21C:
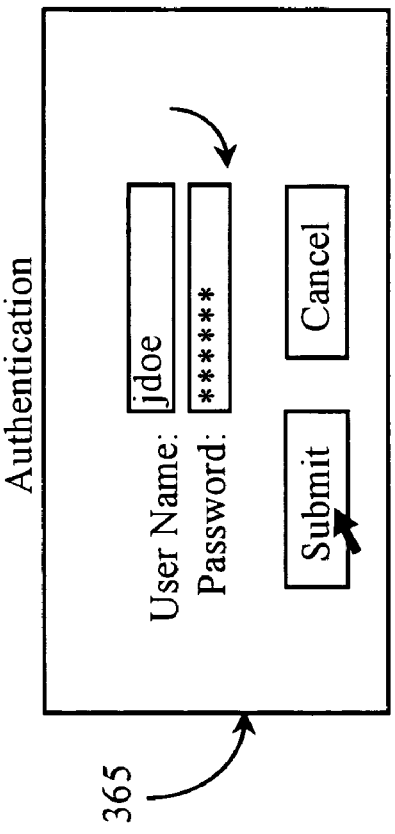

FIG. 21c is a block diagram illustrating the user-interface of FIG. 21a displaying a user-login interface.

FIG. 21d is a block diagram illustrating the user-interface of FIG. 21a displaying a Web result.

Figure 22:
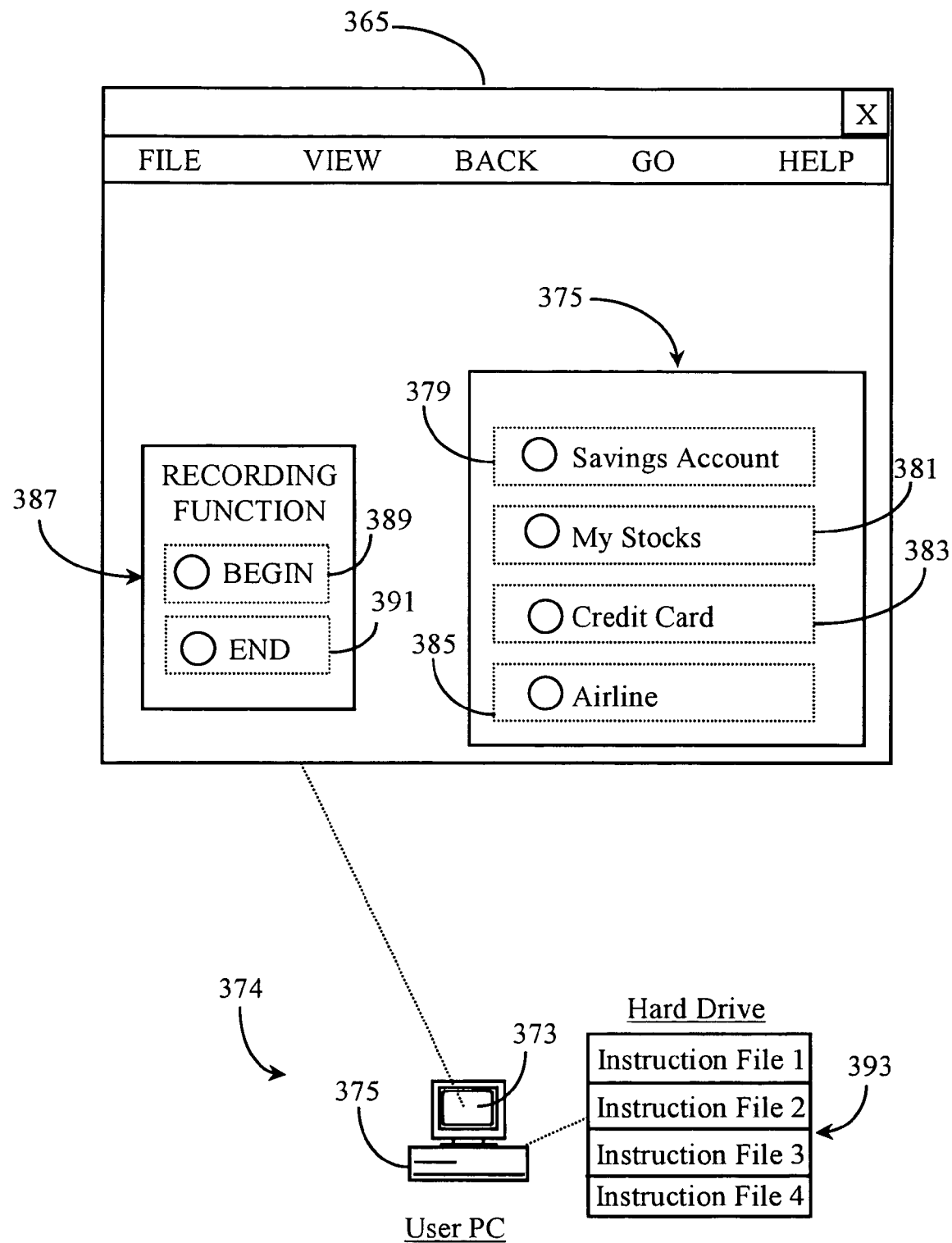

FIG. 22 is a block-diagram illustrating a functional relationship between an automated browser session and instruction files stored on a user's PC according to an embodiment of the present invention.

Figure 23:
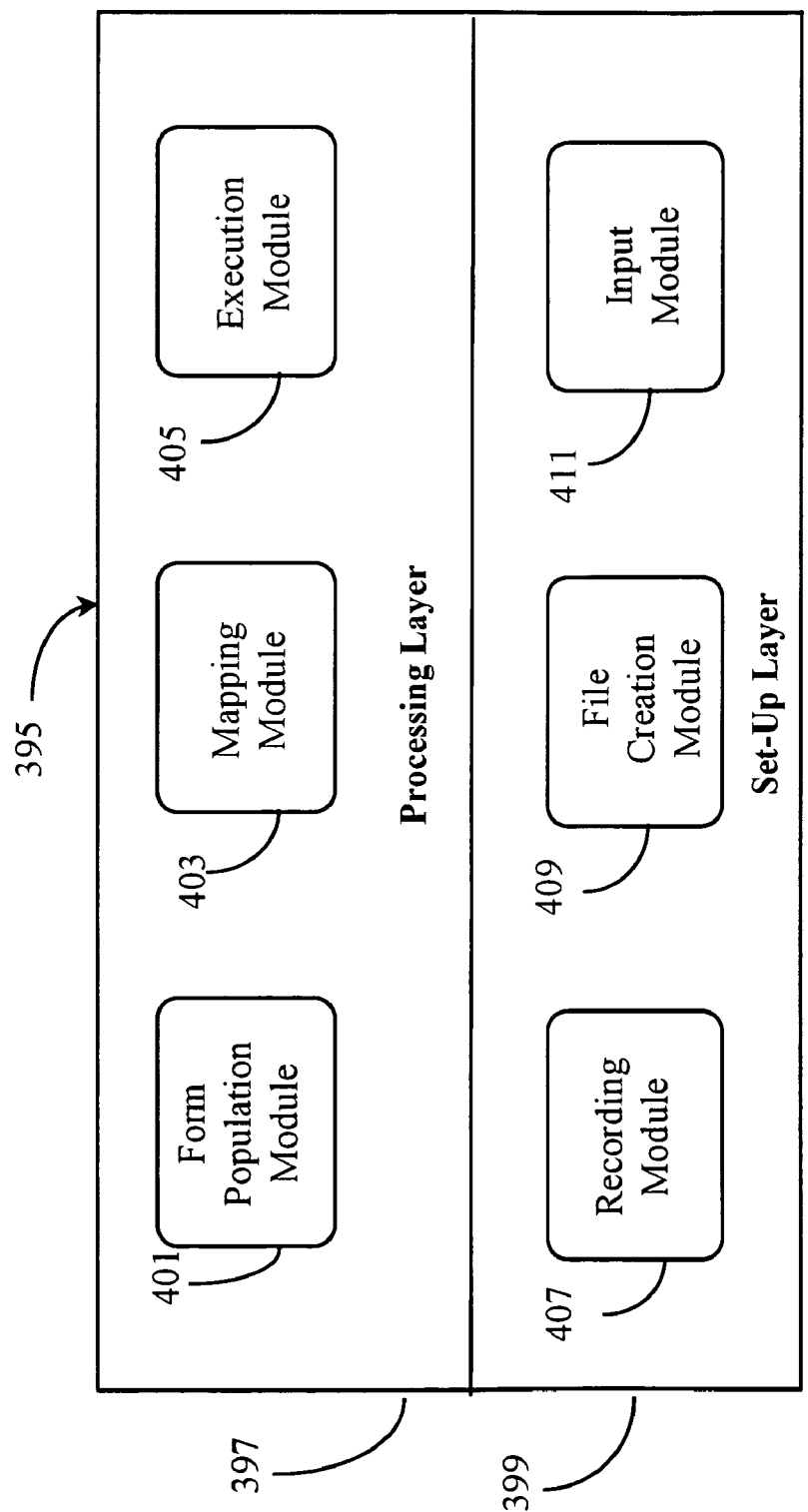

FIG. 23 is block diagram illustrating automated navigation software according to an embodiment of the present invention.

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
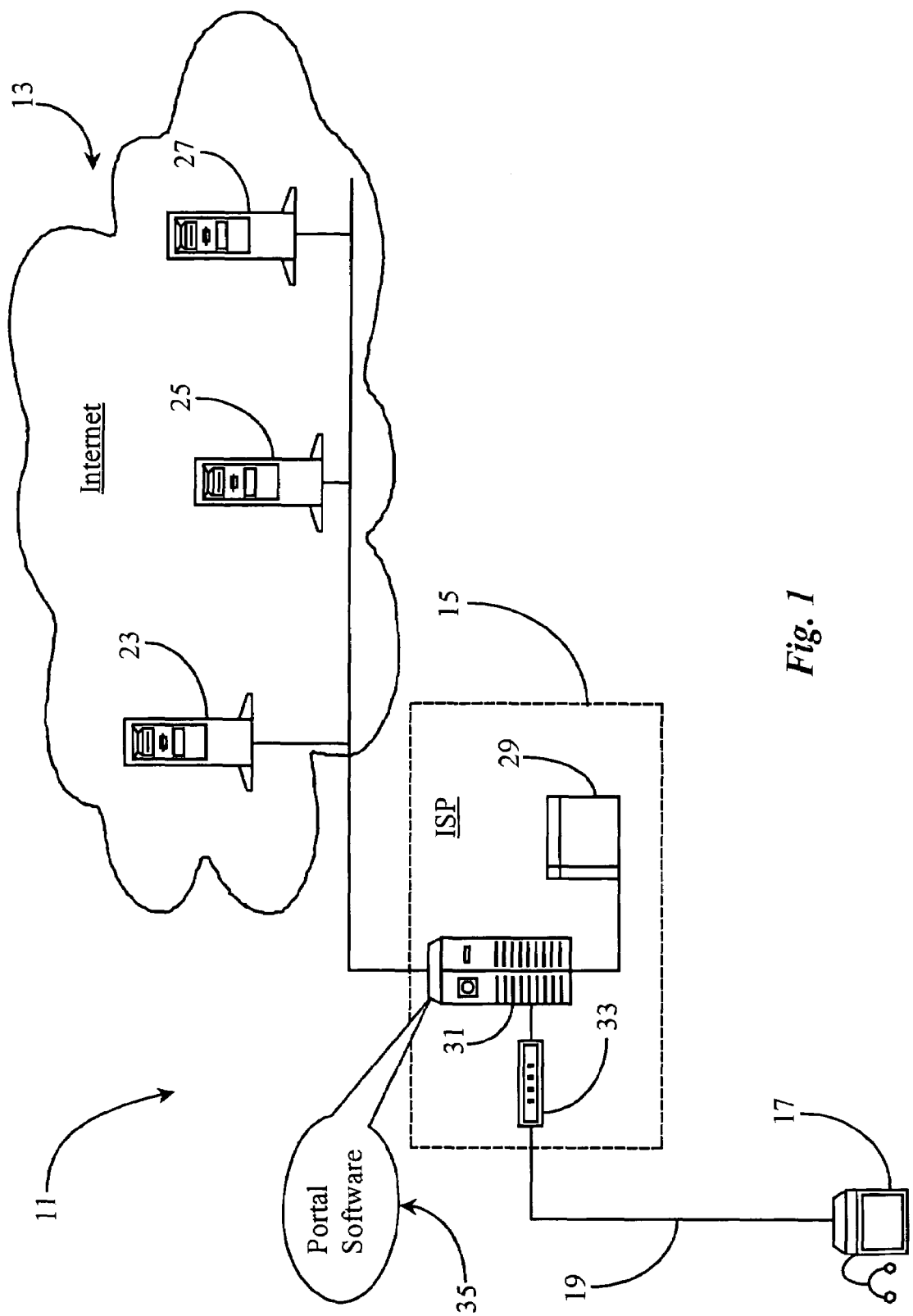
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
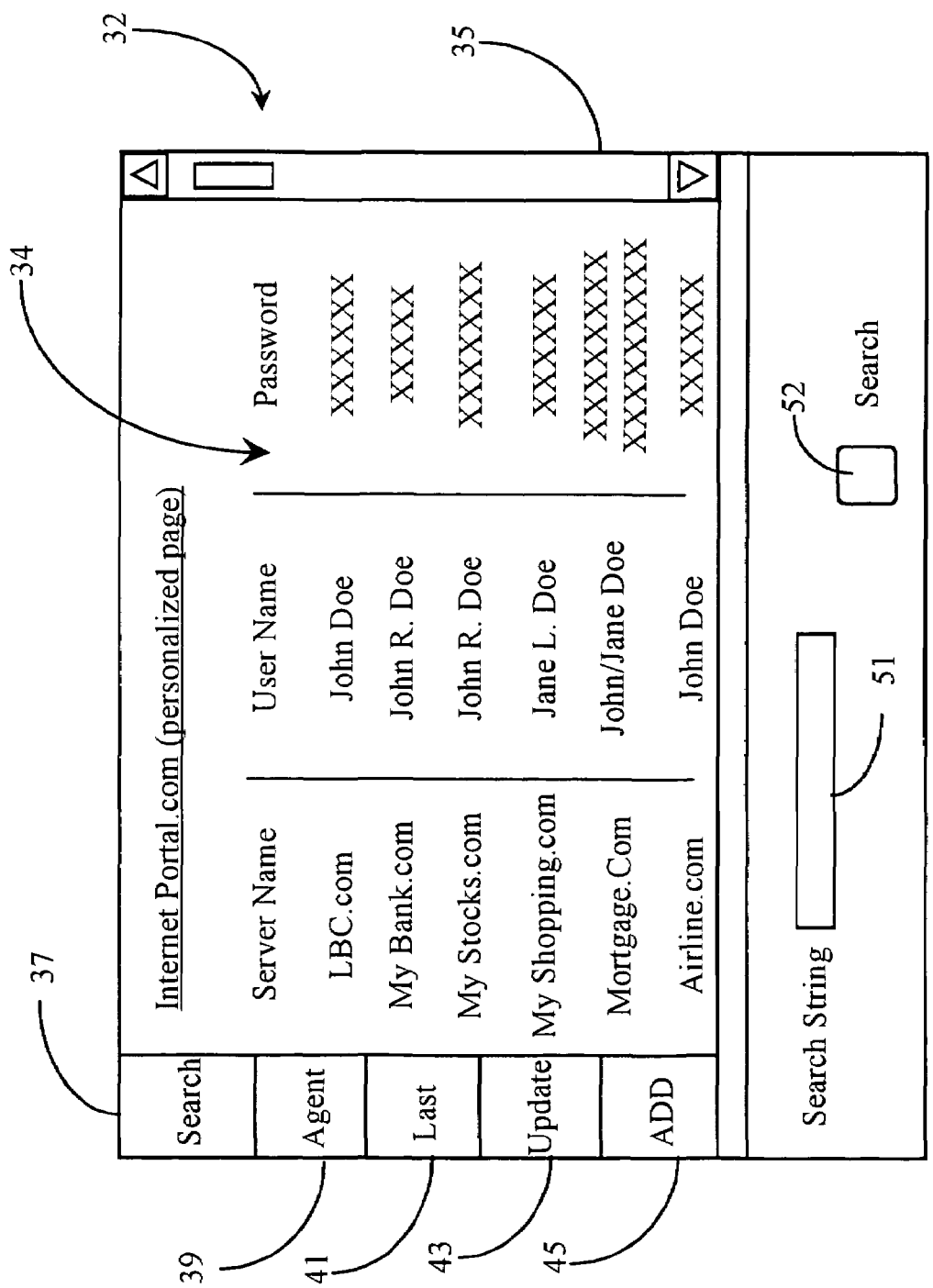
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URLs adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URLs based on typed input such as keywords or the like. In some cases, the number of URLs stored in list 34 can be extensive making a search function such as function 37 an attractive option. A criteria dialog box 51 illustrated as logically separated from and below list 34 is provided and adapted to accept input for search option 37 as is known in the art. In one embodiment search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URLs for content and new address. An add function enables a user to add additional URLs to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
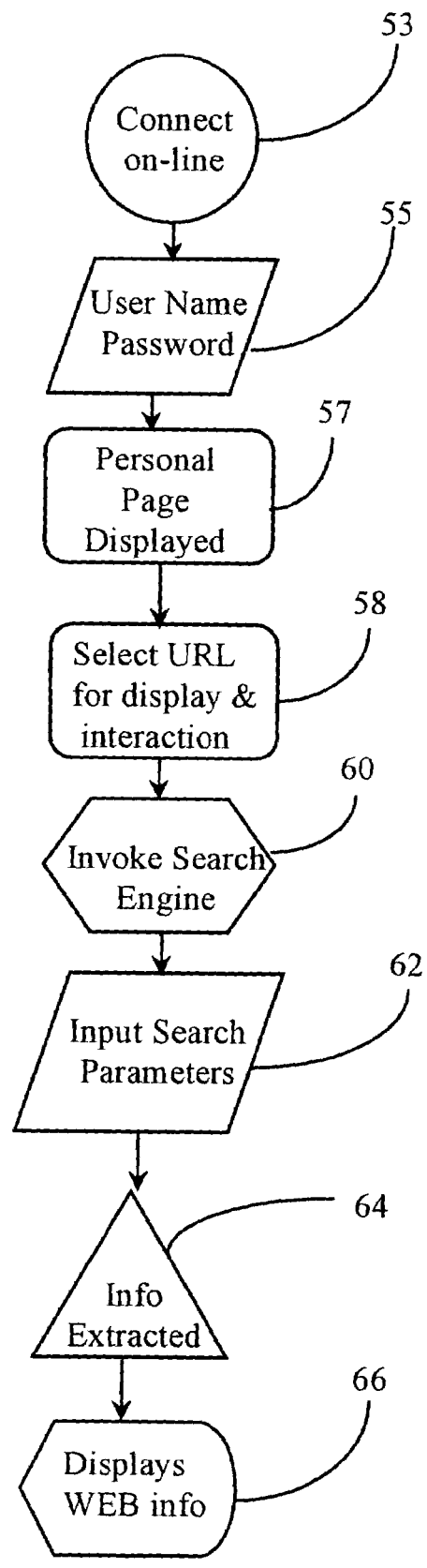
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, In one embodiment may simply be his ISP user name and password. In another embodiment a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URLs, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URLs fitting the description provided by search parameters. A searched list of URLs may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URLs according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
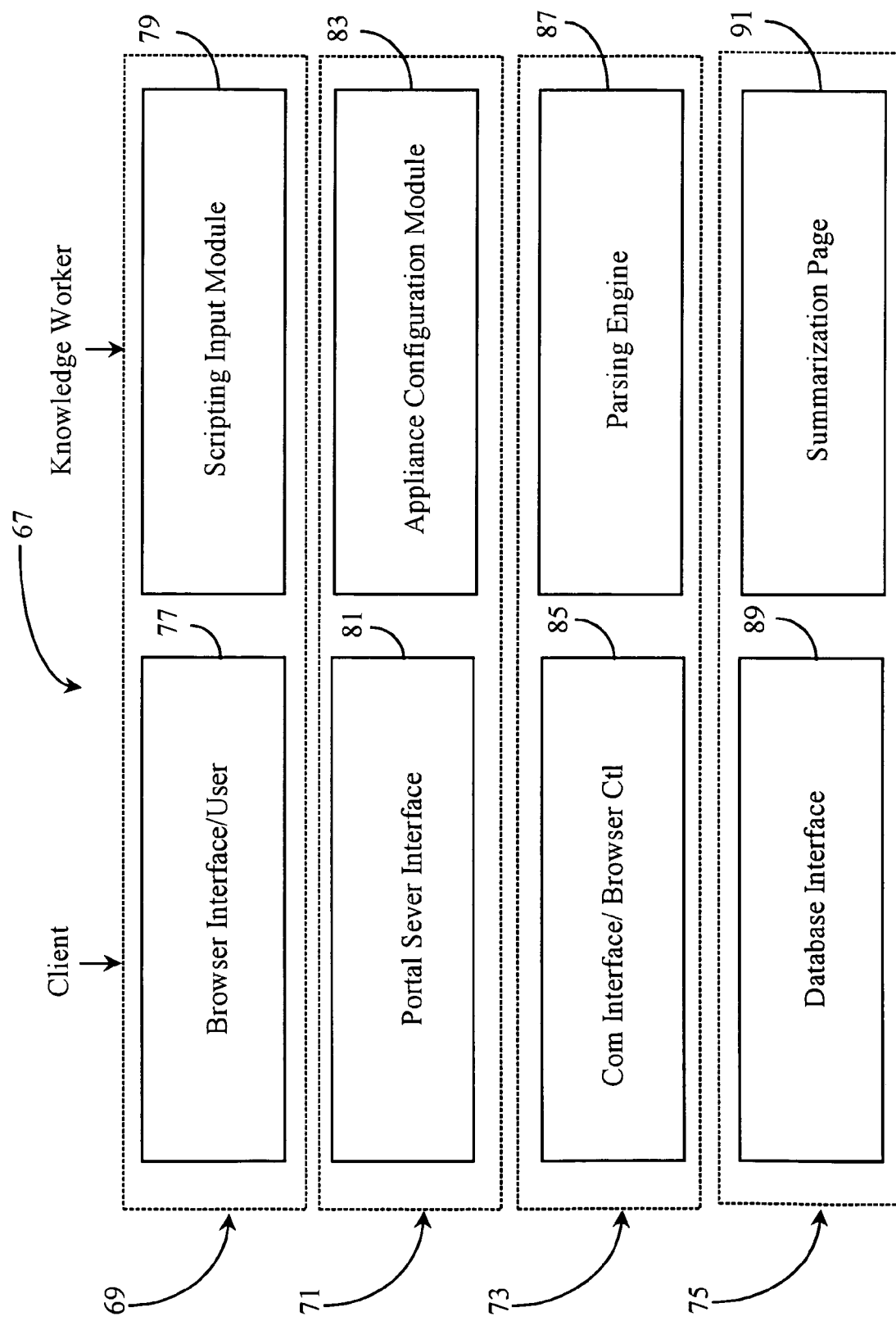
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, In one embodiment be integrated with portal software 35 of FIG. 1 and be provided in the form of a software module separate from agent 39 (FIG. 2). In another embodiment gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform it's function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment Java™ script or another object linking control may be used. The scripted template logic example is as follows:

```
# Site amazon.orders.x—shows status of orders from Amazon login(7);
get("/exec/obidos/order-list/");
my @tables=get_tables_containing_text("Orders:");
my $order_list=new Yodlee::ObjectHolder('orders');
$order_list->source('amazon');
$order_list->link_info( get_link_info() );
my @href_list;
my @container_list;
foreach my $table ( @tables) {
   my @rows=get_table_rows();
foreach my $i ( 0. . $#rows ) {
   select_row( $i );
   my $text=get_text( $rows[ $i] );
   next if $text=~Orders:|Status/;
   my @items=get_row_items();
   next unless @items<=4;
   my( $order_num, $date, $status );
   select_cell( 1 );
   $order_num=get_cell_text();
   my $href=get_url_of_first_href( get_cell() );
   select_cell( 2 );
   $date=get_cell_text();
   select cell( 3 );
   $status=get_cell_text();
   next unless defined $order_num and defined $date and
      defined $status;
   my $order=new Yodlee::Container('orders');
   $order->order_number( $order_num );
   $order->date( $date );
   $order->status( $status );
   $order_list->push_object( $order );
   if( defined $href ) {
      push( @href_list, $href );
      push( @container_list, $order );
for each my $i ( 0 . . $#href_list ) {
   get( $href_list[ $i ] );
   @tables=get_tables_containing_text( "Items Ordered:" );
foreach my $table ( @tables ) {
   my @rows=get_table_rows();
foreach my $j ( 0 . . $#rows) {
   select_row ( $j );
   my $href=get_url_of_first_href( get_row() );
   next unless defined $href;
   my @child_list=get_children( get_row(), 'a' );
   next unless defined $child_list [ 0 ];
   my $text=get_text( $child_list[ 0] );
   $container_list[ $i ]->description( $text );
   }
}
}
result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at it's own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes it's site logic parameters, in which case, the new logic must be accessed and any existing templates must be updated, or a new template may be created for the site. The templates contain site-specific script obtained from the site and stored by the knowledge workers. In one embodiment companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinent information has not changed. If a new password or the like is required, gatherer 67 through control module 73 may present login or password codes from a list of alternative codes provided by a user. In another embodiment a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites.

A logical flow of an exemplary request/response interaction is provided below.

Figure 5:
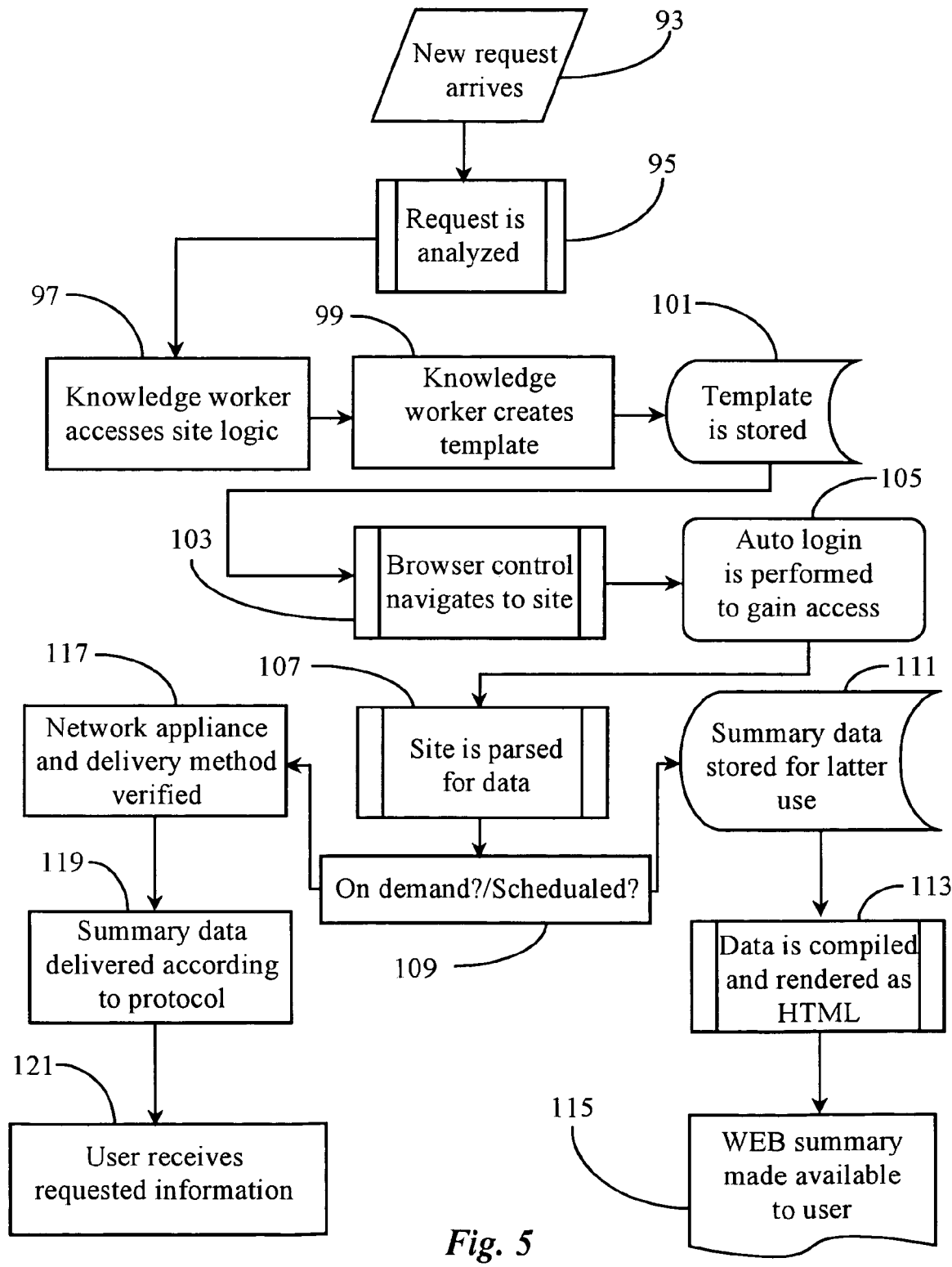
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order).

It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment the knowledge worker may notify the browser control to get the template for it's next task. In some embodiments, a plurality of controls may be used with one template as previously described.

In step 105, automatic log-in is performed, if required, to gain access to each specified URL. In step 107, a specified WEB page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB page in step 1115. The summary page may be posted for access by a user at a time convenient to the user (pull), or may be pushed as a WEB page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
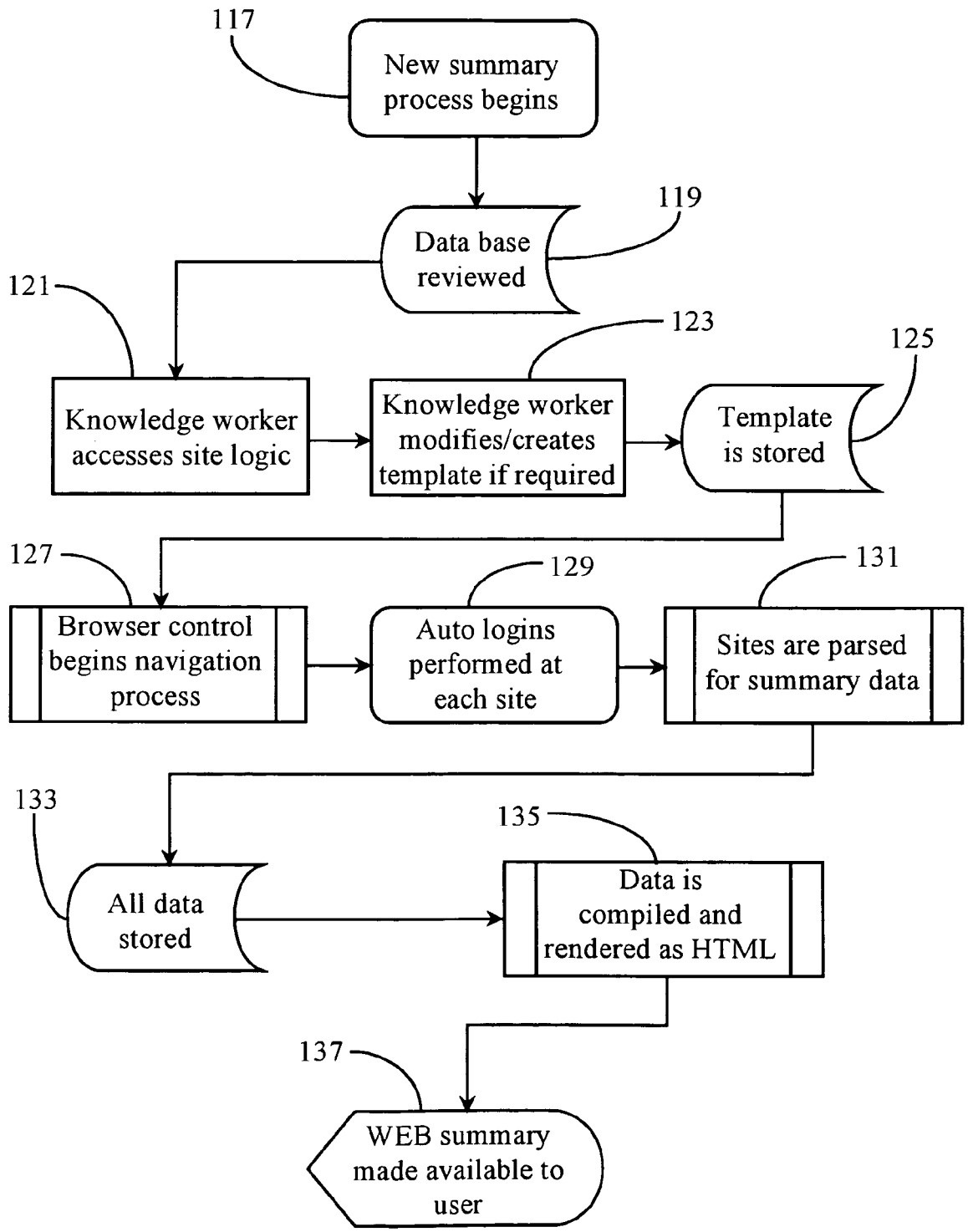
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of its existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

Enhanced Data Parsing and Logic Integration

In another aspect of the present invention, a software application is provided and adapted to recognize and parse data from semi-structured, WEB-based data sources on behalf of a user.

Referring to FIGS. 1–3 of application Ser. No. 09/208,740, a portal system for interacting with WEB-based data is enabled by portal software 35 running on portal server 31 located, in this case, at ISP 15 of FIG. 1. Software 35 allows users who are connected to server 31 via Internet network connection, to access pre-configured URLs without requiring manual log-in procedures to be performed.

Portal Interface 37 is an Interactive WEB page, which may be personalized to a specific user. In the example of FIG. 2, page 37 displays user-visited links and encrypted passwords to those links. Page 37 also provides software tools a user may invoke to search for data either from his or her stored hyperlinks, or from specified fields within the pages defined by the hyperlinks. The example process of FIG. 3 illustrates the above-described function.

FIGS. 4–6 of Ser. No. 09/323,598 illustrate a method and apparatus for performing meta-summarization of WEB-based data on behalf of a user according to user request. Navigation to search the data is performed by proxy using what is termed a gatherer agent (software). Site-logic scripts are prepared by knowledge workers for navigation to the separate user sites. The scripts are typically Java-based executable routines combined with specific data descriptions and, if required, field location information provided by the user at the time of request. A user may request summary data from a plurality of sites and get the data returned on demand, or have it held by the system for later access.

As previously described in the background section, field locations for data must be provided in order for the parsing engine to identify and return specified data in a structured arrangement. An input template provides instruction to the parser concerning what data to obtain for return. The template is created in part by user input through the portal interface and in part by knowledge worker providing data-navigation instruction, which may include field locations for structured data.

The system partly relies on the fact that data requested by a user will appear at a same location (field) within a WEB page every time the system searches for it. The field location then becomes a critical part of finding the data. The inventor provides an enhancement to the WEB-summary system that allows the system to search for and parse data without the constraint of adhering to rigid data structures. Such a method and apparatus is described below.

Figure 7:
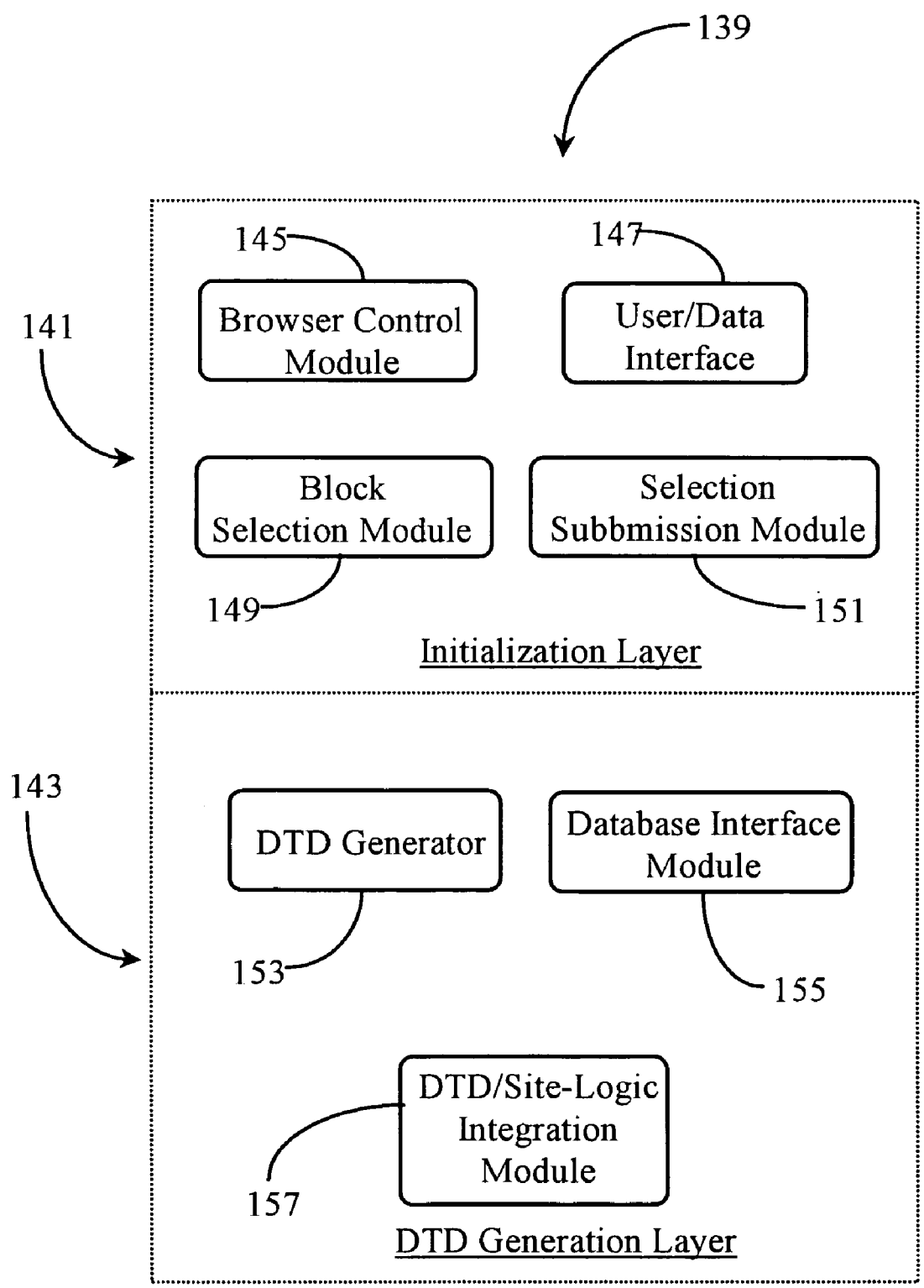
FIG. 7 is a block diagram illustrating a user-interactive template generation application according to an embodiment of the present invention.

FIG. 7 is a block diagram illustrating a user-interactive set-up application 139 according to an embodiment of the present invention. Application 139 is, In a preferred embodiment a graphical tool provided to users and accessible through their respective portal pages. A user invokes application 139 when he or she desires to pre-configure profiled data sources for meta-summarization. In a preferred embodiment activation of application 139 causes an interactive browser window to open within a user's portal page. By working within the window, a user may pre-configure sites for data acquisition.

Application 139 comprises an initialization layer 141 adapted for user interface, and a document type definition (DTD) generation layer 143 adapted to generate DTDs, which describe selected data sources. Initialization layer 141 has a browser control module 145 provided therein and adapted as a browser extension for navigation to selected URLs. Application 139 may be integrated with a user's browser application such that the presented window of application 139 is a browser window as described above. A user-data interface 147 is provided within layer 141 and adapted as a data-input field for entering URLs for navigation purposes. By entering a URL into interface 147, browser control module 145 causes navigation to and presentation of the WEB page defined by the entered URL.

Presentation of the selected WEB page is conducted utilizing the well-known multi-window technology such that the WEB page may be displayed within the window of application 139 while leaving other controls attributed to application 139 visible and accessible to a user. One such control is a block selection module 149, which is adapted as a user-controlled highlighter for selecting specific parts of a WEB page containing data that is desired by the user to be accessed. Module 149 may function by combination of keyboard manipulation and mouse click similar to well-known text selection tools available in word applications.

A selection-submission module 151 is provided within layer 141 and implemented to allow a user to submit selected portions of a WEB page to the portal system for DTD generation. Highlighting or blocking a section of a WEB page defines the boundaries for data search. A user must also specify the type of data to be extracted from the highlighted area of the WEB page.

In practice a user may call-up many WEB pages, highlight (define) sections of each page, and provide data descriptions for data extraction with regard to each page all in one session with application 139. The method described above comprises a meta-data request wherein the returned results are aggregated and displayed to, or otherwise made available to users according to enterprise rules. The output of layer 141 is a highlighted portion of a "structure tree" describing the HTML data structure used to display the data on the target WEB site along with associated data-type descriptions input by a user.

A data structure tree defines how data is displayed on a WEB page in HTML format. An application program interface (API), which is part of the normal browser function understands the HTML data structure used in the construction of a WEB page, which is available at the source. Therefore, a specific structure tree is captured by browser module 145 every time an associated WEB page is displayed in application window 139. User-highlighted portions of a WEB page define "portions" of the overall data structure tree of that page. Therefore, the output of layer 141 comprises an entire data structure tree for a WEB page, a highlighted portion of that data structure, and a description of the type of human-readable data to be extracted from that portion of the tree.

Layer 143 is responsible for producing DTDs adapted to facilitate data search and extraction. A DTD generator is provided within layer 143 and adapted to generate a DTD of a data source using information supplied by layer 141. A DTD is a template written in a language such as XML that is understood by a browser/data-parsing application. In a preferred embodiment a DTD is created in Extensible Markup Language (XML), however, any standard script language may be employed such as Standard Generalized Markup Language (SGML). A DTD is generated for each portion of a WEB page a user highlights.

A database interface module 155 is provided within layer 143 and adapted to allow interface to a connected database for the purpose of obtaining site-logic scripts for navigation, which include log-in blocks for performing automated log-in function for sites requiring passwords. In some cases new site-logic scripts are required if data is to be extracted from a new page. Interface 155 may also be used to obtain any other useful information.

A DTD/site-logic integration module 157 is provided within layer 143 and adapted to create a routine combining site logic and DTD templates in such a way that navigation and data extraction is performed seamlessly and automatically. For example, a site logic script with a log-in block is used to navigate to and access a particular URL, then a DTD template portion reveals where on that URL page to look for data and what type of data to extract from the URL page. Information gathering for a next URL would follow a next site-logic and DTD instruction contained in the routine and marked for that URL and so on. An automated navigation and data extraction routine may facilitate a plurality of URLs included in one data search execution.

It is conceivable that one routine containing the required instruction blocks could facilitate automated navigation and information retrieval from a great many URLs during one automated routine on behalf of a user. A single WEB site or a combination of, or all of a user's WEB sites may be processed for data during a single automated process. All that is required of a user is to first set-up a URL or URLs for data searching by navigating to them, highlighting portions contained therein, and providing a description of the type of data to be extracted. Once set-up, summary data from the affected URL pages may be periodically gathered on behalf of the user and presented in a variety of ways, some of which are described in disclosure pertaining to Ser. No. 09/208,740 and Ser. No. 09/323,598.

It will be apparent to one with skill in the art that application 139 as exemplified above is provided to execute as a network-supported application on a client. In this example, layer 141 is provided to execute as a client-side application while layer 143 is provided and executed at server side. Communication and cooperation between layers 141 and 143 is achieved through appropriate network-interface technologies known in the art. Proxy navigating and data gathering is executed at the server side on behalf of a user. In one embodiment all of the function of application 139 may be provided at the client's side. In another, all of the function may be applied on the server side, in which case a knowledge worker associated with the server may initialize the sites for search.

It will also be apparent to one with skill in the art that other modules responsible for added function may, if desired, be provided within application 139 without departing from the spirit and scope of the present invention. For example, a module for sectoring a pre-configured data search and scheduling each sector for execution may be provided within layer 141. In this case, a user may schedule alternate data searches of separate groups of URLs. Other lesser controls (not illustrated) may also be provided such as edit controls, clear selection, cancel search, and so on. There are many possibilities. The inventor intends that application 139 represent just one simple implementation out of many possible alternative implementations.

Figure 8:
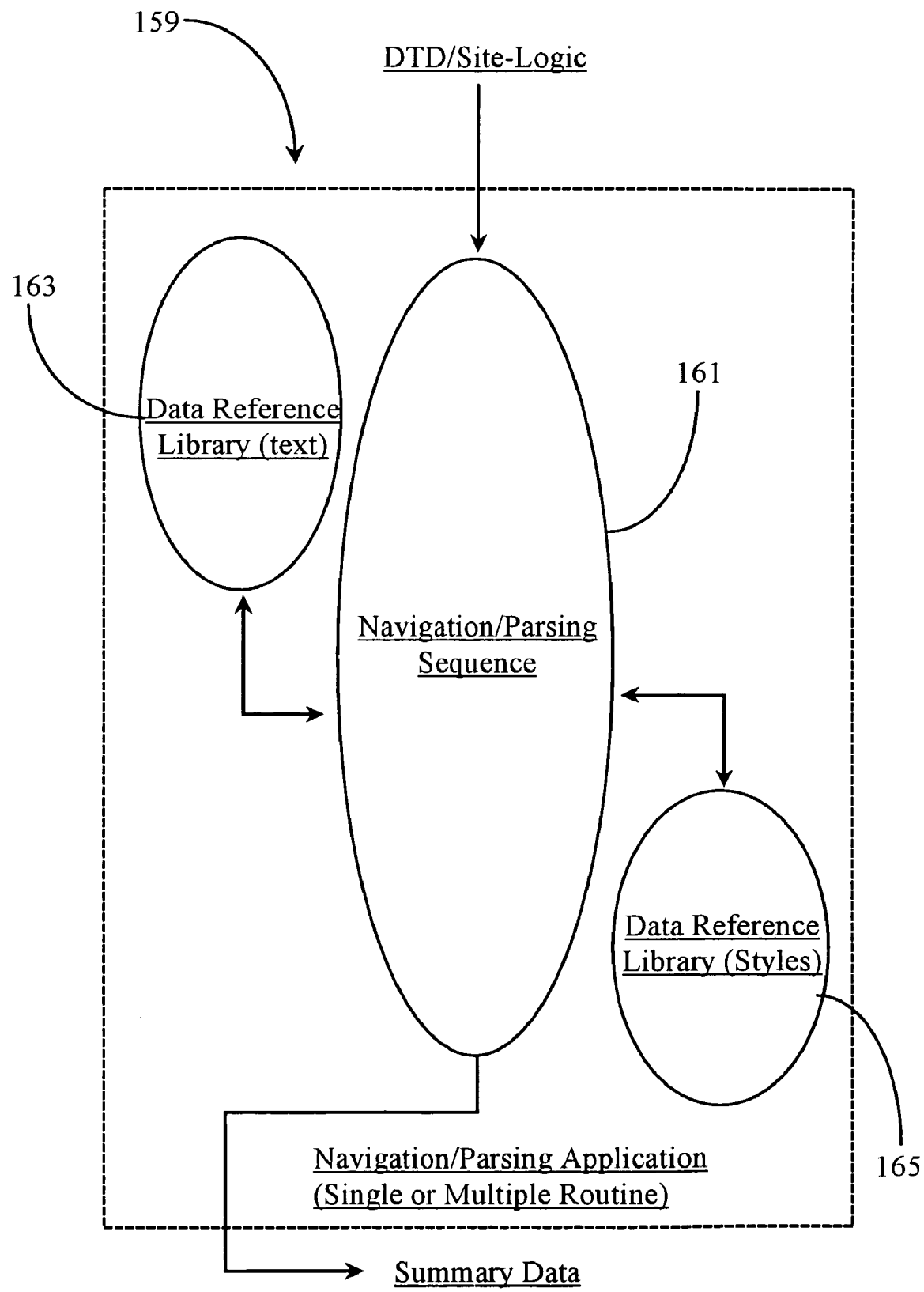
FIG. 8 is a block diagram illustrating intelligent parsing capability according to an embodiment of the present invention.

FIG. 8 is a block diagram illustrating intelligent navigation and parsing capability according to an embodiment of the present invention. A navigation/parsing application 159 is provided for the purpose of navigating to and parsing data from WEB-based data sources on behalf of a user. Application 159 may be considered somewhat analogous to the "gathering agent" described in Ser. No. 09/323/598. Application 159 is responsible for navigating to selected URLs and extracting data from them for return to users. Enhanced capability provided in part by enhanced input data for navigation and in part by built-in intelligence enables application 159 to operate more intelligently and in a more streamlined manner with respect to workload.

Input to application 159 comprises DTD data and site-logic data interwoven into an instruction routine that provides instruction for navigation, log-in (if required), and data parsing. A directional arrow labeled DTD/Site-logic illustrates data input. A navigation and parsing sequence 161 is executed based on input data instruction. Parsing intelligence is enhanced by virtue of data reference libraries 163 and 165. Library 163 is responsible for enabling text matches and associations.

Library 163 is flexible such that a parsed word may be associated with a variety of similar words or phrases. For example, if data is being parsed from an investment site quoting stock prices, then the appearance of the word portfolio may be equated with not only the exact word, but also with a similar word or phrases known to equate with the word such as "stock portfolio", "current portfolio", "view portfolio", and so on. This enables a user to approximate the description of the type of data that is extracted from a highlighted portion of a WEB page. Moreover, if a WEB master changes the description of the data between searches, an intelligent parser will still be able to find the data through word and phrase association techniques.

Library 165 contains examples of style variations that may be used in the presentation of data on a WEB page. Library 165 enables the parser to understand data presented in a variety of styles such as italic, bold, underlined, small fonts, larger fonts, text formats, font styles, and so on. In this way, a parser may still find the requested data even if a WEB master changes the style or format of presentation between data searches.

In one embodiment of the present invention, successful request histories may be compiled and used to enhance parsing and data return. Parsing is, in this example, restricted to a highlighted portion or portions of a WEB page, wherein the requested data presumably resides. Because of this, it is likely that only a few differing types of information will be available in the highlighted portion of a WEB page. Therefore, past request records may be used in an attempt to eliminate or confirm a data type residing in a highlighted section under consideration. This embodiment assumes that a current request for data does not register any matching words or phrases contained in the data type or in parsing intelligence.

To further illustrate, assume that there are two different data types available in a highlighted portion of a WEB page. If the page is a banking page, one of the data sets may be a list of available loans and current interest rates. The other data set included in the section may be a list of most recent savings account deposits and withdraws. By parsing all of the data in the section, and comparing the data to a previous (successful) routine, it may be determined which type of data was previously returned. By comparing the previous natural language request to the current one, it may be determined if the requests are similar in nature. If a previous request read "return available loan options and current rates" it can be determined that the loan data did match that request. If a current non-registering request reads "send me my balance", it may be determined that the current request does not register with the system, but it is also not analogous to the previous successful request. Therefore, the data set corresponding to the request for loan information is discarded and the remaining data is returned including the account information.

The above example serves to illustrate adaptive intelligence that is provided to navigation and parsing sequence 161. It is assumed herein that a user will only select portions of a WEB page where desired data resides. Therefore, it is likely in many cases that one or only a few types of data will be included in a selected portion. This fact makes it easier to determine what data will be returned to a user. It is also noted here that all of the data from a selected portion of a WEB page is retrieved from a source. Parsing of the data after it is retrieved determines which data will be returned to a user. Data that does not fit a request for that section is discarded. In one embodiment of the present invention, all data from a section is returned by default if a request cannot be matched to specific data in the section.

In still another embodiment, a WEB master may change the location of data on a WEB page between routine data searches such that it is moved out of a user's highlighted section of the page. In this case, a routine could be performed to find the moved data if the WEB master has retained the data structure. To accomplish this, the system compares the old highlighted structure with the new structure of the WEB page and matches the structures. If the data contained in the new section matches the current request, then a correction is made.

Application 159 may be executed to navigate to and gather data from a single data source or from multiple data sources depending on pre-configuration. Conceivably, there is no limit to the number of URLs that may be included in one executed routine.

In still another embodiment, application 159 may be enhanced with additional enterprise rules to allow for even more intelligent parsing capability. For example, in addition to data reference libraries 163 and 165, which provide intelligence regarding text and style variations, an additional rules base may be provided for allowing system 161 to determine logical application of certain data-types that are parsed.

In some instances, data requested by a user may include time dependent data that may change or otherwise may not be valid after a certain period of time or date. One good example of this would be if a user requests all ongoing chat events from a plurality of separate chat sites wherein the events fall under a general topic or field of entertainment. Application 159 would navigate as previously described, and system 161 would parse the available chat titles at each site. An additional step would eliminate all chat-event titles or event fields that do not closely match the request thus narrowing the field. A subsequent step would eliminate all remaining events that are almost over. A next step may eliminate all remaining events that are marked for gender or age participation other than what is known about the requester. Ultimately, the field is narrowed to those events that match the request, have agreeable participation requirements for the requester, and have sufficient time left in session for optimum participation. As a final step, the top 10 or so qualifying events may be selected for the requester based on number of participants etc.

The above method may be applied to any type of timed live event presented on the Internet. Live concerts, live video presentations, live radio shows, and many other types of WEB-events may be included. Rules governing such events may be compiled and made a part of user profile information and a rules base added to application 159 may be retrieved from that information and therefore will be individual to a requester. There are many possibilities.

Figure 9:
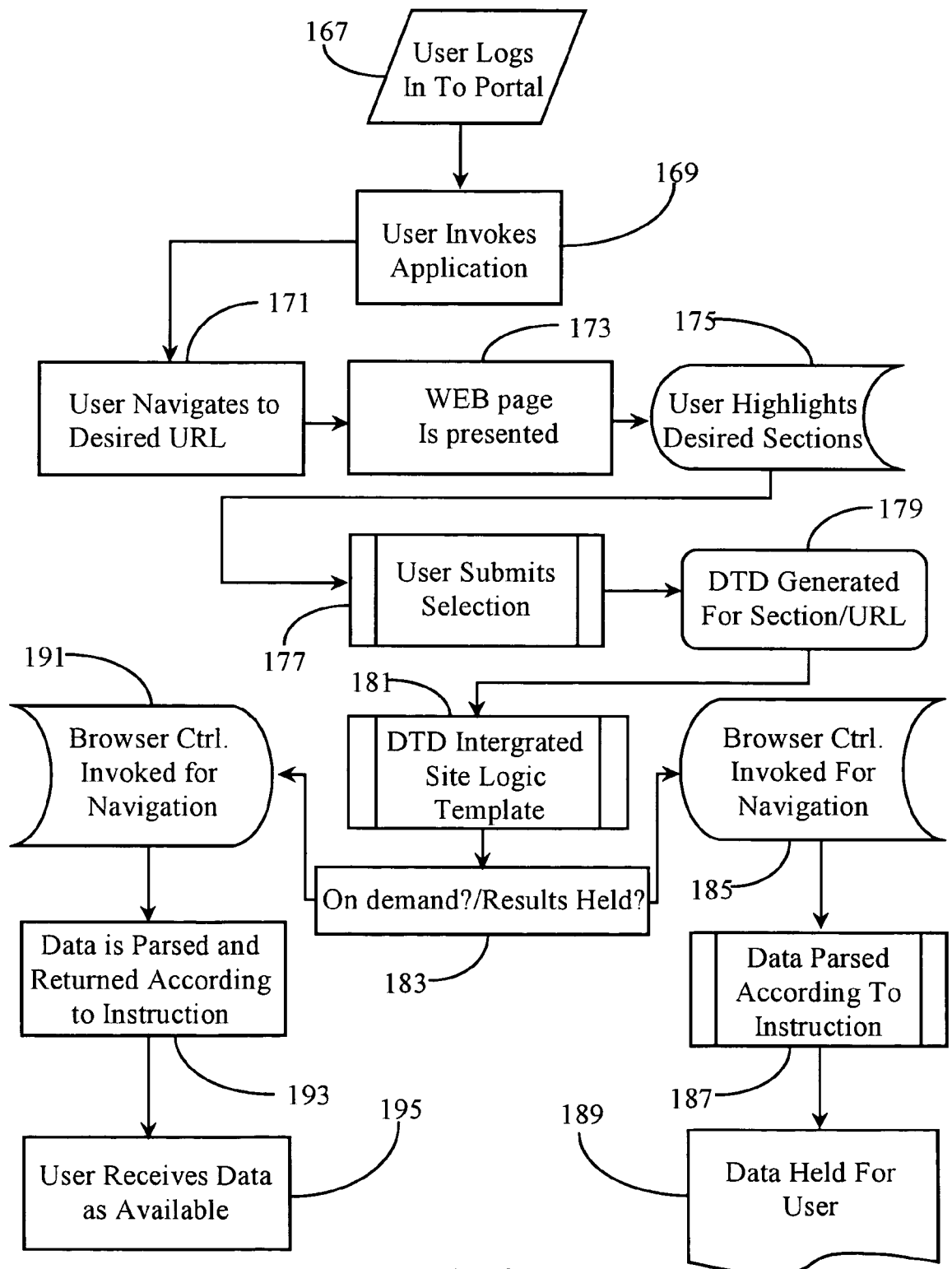
FIG. 9 is a flow chart illustrating a semi-structured data retrieval process according to an embodiment of the present invention.

FIG. 9 is a flow chart illustrating a semi-structured data retrieval process according to an embodiment of the present invention. In step 167 a user logs into his or her personal portal page. Typically, a user name and password is required during step 167 for authentication purposes, although in some cases the log-in may be automatic. At step 169 the user invokes application 139, which is presented as an interactive tool along with other functions in the portal page. Application 139 is used to pre-configure URLs for data search and return as was previously described. During this step, application 139 opens a browser window for navigation. It is important to note here that In a preferred embodiment a user pre-configures each WEB page while on-line and navigating to each page. However, this is not required to practice the present invention. In one embodiment a user may work off-line if he or she has all of the WEB pages cached in their presentable form.

At step 171, a user navigates to a desired URL for purposes of highlighting sections of the page for data retrieval. At step 173, the entered URL is displayed in the open window. Using a provided selection tool, a user then highlights a desired section or sections of a displayed WEB page at step 175. A user may highlight one or more sections of a same page. Moreover, one highlighted section may contain one or more sets of data a user wishes to retrieve. During step 175, a user also types in a data description concerning what type of data is to be returned from the highlighted portion of the page. If only one type of data exists in the highlighted section, then a description may not be necessary. It is noted herein that a user will likely highlight a section larger than a portion just containing the desired data in case the data is moved slightly within a same WEB page between data searches.

At step 177 a user submits his or her selection and request entries to a server application responsible for further processing. Layer 143 of FIG. 7 represents the above mentioned server application. In this step, a user may configure many URL sites and data requests associated with the sites and submit all of the information collectively by one action.

At step 179, a DTD is generated for each highlighted portion of each URL. DTDs provide instruction to the parsing application as previously described in FIG. 7. At step 181, DTDs are organized and integrated with applicable site-logic including any log-in instructions required to access WEB sites. The result of this integration is an executable routine and instruction template for the navigation and data-gathering system taught in disclosure above. After a user submits all of the required data in step 177, the process is entirely automated.

At step 183, it is determined whether data results are requested immediately (on demand) or whether they are directed to be held for a user for later access. If a user requests immediate data return, then a browser control immediately executes according to generated instruction at step 191. A user may configure and request data from one URL at a time and receive data while still engaged in requesting data from a next page so as to operate in an active session of requesting and receiving data. However, typical implementation will be to pre-configure and request data from a series of URLs and schedule the data return for a later time.

At step 193, data is gathered and results are returned according to completed instruction. At step 195 a user receives the resulting data as it becomes available. It is noted herein that a user may practice an active session of immediate data return upon configuration and data request submissions. It is also noted herein that a user may complete a configuration and request submission process, and set-up a periodic time-table for the process to execute. The latter is the more likely and more useful scenario.

If it is directed that a user have his or her data results held for later access, then at step 185 a browser control is invoked for execution of the request. At step 185 data is found and parsed according to instruction. At step 189, data results are aggregated and held for a requesting user. Activation of the data-gathering and return process may be delayed according to schedule with periodically scheduled return of results.

It will be apparent to one with skill in the art that the interactive process described herein may be altered to accommodate a number of different user preferences without departing from the spirit and scope of the present invention. For example, a user may pre-configure separate groups of URLs for data retrieval and cause separate processes to operate according to user selected time periods. For example, a user may wish to have all of his or her account information delivered on a certain day each week while he or she gets a news headline summary daily. There are many possibilities. The inventor intends that this process example represent just one of many possible orders for practicing the present invention.

Automatic Proxy WEB-Site/Service Registration

In another aspect of the present invention, a method and apparatus including software is provided for automatic proxy registration to a WEB-site or service on behalf of portal system subscribers.

Figure 10:
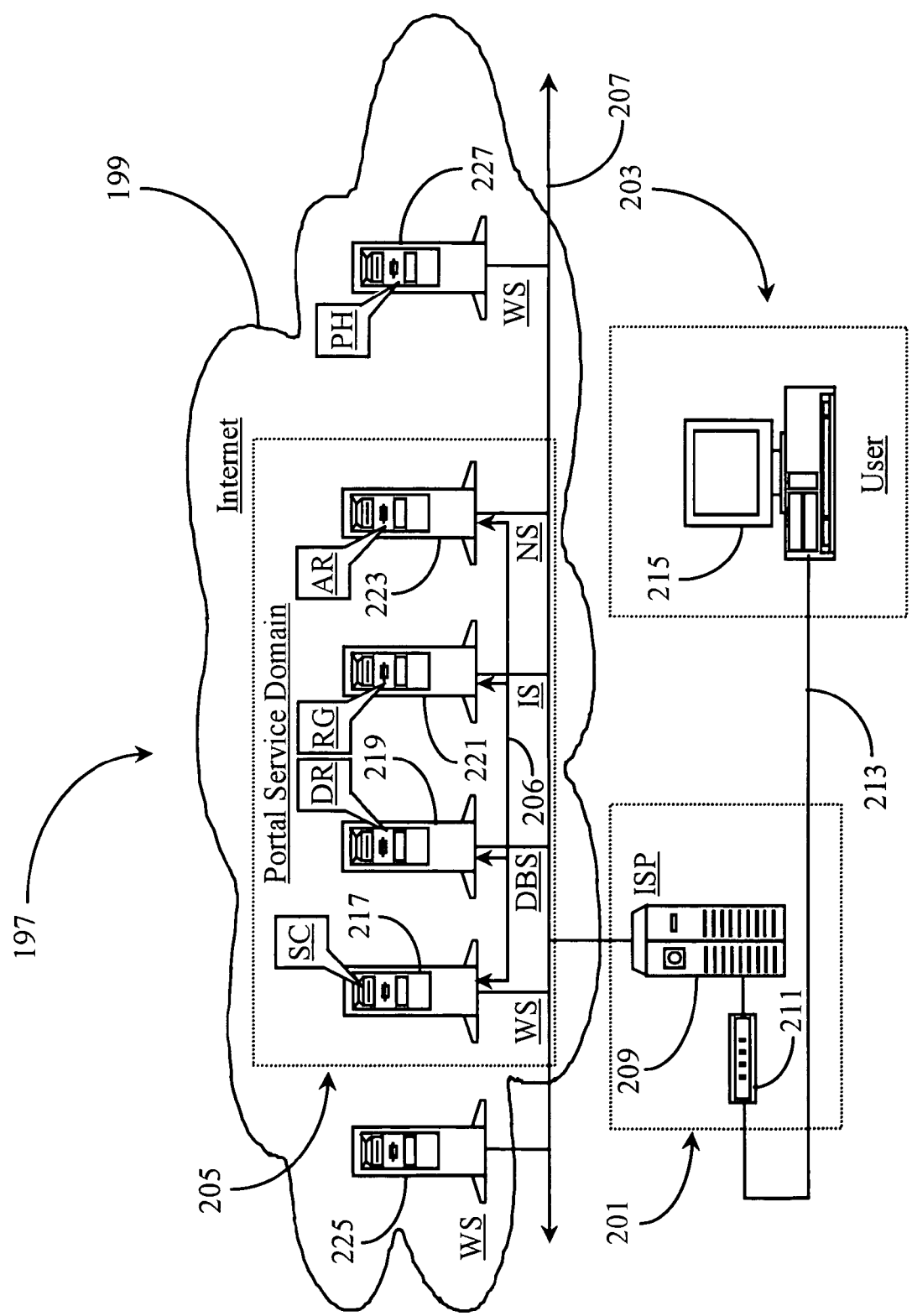
FIG. 10 is an overview of a communications network enhanced with automatic site registration according to an embodiment of the present invention.

FIG. 10 is a network overview of a communications network 197 enhanced with automatic site-registration according to an embodiment of the present invention. Communications network 197 comprises a data packet network (DPN) 199, a portal service domain 205, an ISP 201, and an exemplary user 203. Some of the elements that will be described in this specification are very similar to elements described in disclosure contained in the cross-referenced applications listed under the cross-reference section above. However, those similar elements re-introduced in this specification are modified or enhanced to practice the present invention. Therefore, similar elements newly introduced in this specification have new element numbers. Analogies are drawn to previous elements throughout this specification where appropriate.

DPN 199 is, in this example, the well-known Internet network and will hereinafter be referred to as Internet 199. Internet 199 is analogous to Internet 13 of FIG. 1 in description and may well be another type of known DPN as described in FIG. 1 (Internet 13) above. The inventor chooses Internet 199 as a preferred example because of high public access characteristic. Internet 199 has an Internet backbone 207 illustrated therein. Backbone 207 represents all of the lines, equipment, and connection points that make up the global Internet network including connected sub-networks as are known in the art. Therefore, there is no geographic limit to the practice of the present invention. The inventor deems that illustration of just a portion of Internet 199 (illustrated within cloud) is sufficient for explanation and disclosure of the present invention.

Portal service domain 205 (enclosed in dotted rectangle) represents all of the equipment and network connections within Internet 199 that are hosted by an exemplary company providing portal services. For example, domain 205 comprises a WEB-server (WS) 217, a database server (DBS) 219, an instant server (IS) 221, and a navigation server (NS) 223. Each of servers 217–223 is network-connected to backbone 207. Moreover, all of the above-described servers are interconnected, in this example, by a separate data network 206. Network 206 is optional and only represents an efficient method for facilitating dedicated data and command communication between servers and is not required to practice the present invention. This example differs somewhat from the example of FIG. 1 wherein portal services are hosted by ISP 15. In this example, portal services are hosted within the domain of Internet 199 instead. The exact location of service-providing equipment is optional, as is the description of a hosting company.

WS 217 is configured as a main portal WEB-server and represents a first interface to subscriber/users exercising various portal services. Servers 219–223 represent separate secondary servers each providing dedicated function related to the present invention. For example, DBS 219 is adapted as a central repository for storing profile data, enterprise data, and summary data obtained from external sources within the domain of Internet 199 and returned thereto as described in the cross-referenced applications dealing with WEB summary gathering. IS 221 is adapted as an order generating server, which prepares job orders according to user requests, and NS 223 is adapted as a proxy navigation server. More detail about servers 217–223 is provided below in this specification.

Illustrated outside of domain 205 are a WS 225 and a WS 227. WEB-servers 225 and 227 represent data or information servers as are known in the art for serving information and enabling services to any users registered thereto for purpose of obtaining access to data and services therefrom. For example, WS 225 may be a bank server, an investment server, an entertainment server, or any other class of servers known in the art. The same may be assumed regarding WS 227. A separate entity or entities other than the one hosting domain 205 in this example, typically host servers 225 and 227.

ISP 201 is configured to provide typical Internet connection services as are known in the art. User 203 is an exemplary user, which in this case, is a subscriber to the portal services available from domain 205. User 203 is provided access to Internet 199 through ISP 201. For example, user 203 operates an Internet appliance, illustrated herein as a personal computer (PC) 215. PC 215 is illustrated as having an Internet connection line 213 connected thereto and progressing to a modem bank 211 (shown as single modem icon) of an ISP connection server 209, which in turn is connected to backbone 207 within Internet 199.

In this way, user 203 has access to Internet 199. Internet connection line 213 may be a conventional telephone line, an ISDN line, a DSL line, or any other known connection technology including wireless connection. PC 215 may be any other type of known Internet appliance capable of connecting to and downloading information from Internet 199. In this example, it is assumed that user 203 is a subscriber to Internet portal services offered through domain 205. Therefore, it is assumed that an active session is established between user 203 operating PC 215 and WS 217 within domain 205. WS 217 is, in this example, a portal server adapted to serve a portal home page to user 203.

Also in this example, auto-registration capability is distributed over servers 217–223 within domain 205. However, this is not required in order to practice the present invention, but merely illustrated as such for purpose of discussion and separation of function. In other embodiments, other distribution arrangements may be observed. Furthermore, all of the function of the present invention may be facilitated on one server.

WS 217 (portal server) has an instance of site configuration (SC) software provided therein. SC is a first part of an auto-registration suite. SC software provides an interface to user 203 from which he or she may pre-configure WEB-sites for auto registration. Part of that capability includes the provision of an interactive tool known to the inventor as "Reg Spy" (not shown). The basic function of SC software on server 217 is to allow user 203 to navigate to and select (using Reg Spy) the proper URLs and forms, which will then be used for obtaining registration to a site on behalf of user 203.

In one embodiment of the present invention, a plurality of WEB-sites may already be configured for auto-registration service and may be presented to user 203 at time of log-in to WS 217, perhaps, as part of his or her personal home page. This is made evident by illustration of an instance of portal host (PH) associated with WS 227. PH more accurately reflects that domain 205 already has all of the required site-logic and form data to allow a user to auto-register to a service provided by WS 227. PH, as illustrated here, could be present in the form of a hyperlink embedded in any given WEB-page held in WS 227 that is currently facilitating user registration. By clicking on a (PH) hyperlink during normal WEB navigation, user 203 could launch an auto-registration process beginning within domain 205. In some cases, however, user 203 may wish to add new sites for auto registration. WS 225 represents a server containing such a new WEB-site or sites not previously configured by domain 205.

DBS server 219, as previously described, holds profile data, enterprise data, and summary data. An instance of database renderer (DR) is provided to execute on DBS 219. DR software is adapted to allow writing to and parsing from DBS according to need. IS 221 has an instance of request generation (RG) software resident therein. RG software is provided and adapted to generate a machine-readable job-order from information submitted by user 203 and from prior information available in DBS 219. IS 221 formulates a job order, which includes instruction for navigation and log-in, if required. The output of RG software is a machine-readable job-order that carries instruction for site-navigation and instruction for site registration purposes.

NS server 223 is adapted by means of an instance of auto-registration (AR) software. AR software is adapted to physically navigate (according to provided instruction) to a target site on behalf of user 203, and register user 203 to the target site or service. AR software performs a significant portion of auto registration in that it actually submits the data required for site-registration on behalf of user 203 and returns accepted user-data back to domain 205. Data "gathered" after an auto-registration function includes accepted log-in names and passwords to the site. NS software is similar to the "gathering agent" described in Ser. No. 09/323/598 except that in addition to navigating to a WEB-site and retrieving data from that site, auto registration sequences may also be performed.

Total auto-registration capability includes a means for site-configuration (SC), a means for converting collected data and pre-known information into a job order (RG), a means for proxy navigation and data submission to a WEB-site (AR), and a means for returning successful registration data to a data repository for subsequent use (AR, DR).

As previously described, WS 225 and WS 227 represent WEB-servers containing URLs invoking a form or forms, which user 203 may fill out (populate) and submit for purpose of obtaining services therefrom. In addition to registration forms, other forms may be processed by method and apparatus of the present invention. For example, purchasing forms, survey forms, classified add forms, auction forms, and others make up a list of possible form types to which the methods and apparatus of the present invention may be adapted.

Auto registration may follow two separate orders. One is that a user selects a pre-configured site for registration. The other is that a user pre-configures a found site for registration. Assume now that user 203 wishes to register to receive a service available from WS 225. In this case, WS 225 is not pre-configured or necessarily known to domain 205. In order to auto-register to a site or service hosted by server 225 user 203 must first pre-configure the site.

In general practice of the present invention, user 203 would first log-in to WS 217 and establish an on-line session between PC 215 and WS 217. User 203 would then invoke SC software, and proceed to navigate to WS 225 and to the page offering registration for services. Upon arriving at the site, user 203 invoking SC software, highlights the required form or forms that must be filled for registering to a service or services facilitated by the target WEB-site, and page keywords identifying the form carrying page to the service. This "site data" including form data is transferred to WS 217.

Once WS 217 has the required site data including the required forms, it checks DBS 219 to see if all of the required "submission" information is already available in a user profile to submit for this particular registration action. It is noted herein that user 203 may have several stored profiles that he or she may use to register to different types or classes of services. In this case a user may designate a particular profile for registering to a particular service as part of the configuration process. Data stored in a profile may include credit card information, address information, e-mail information, telephone information, age and gender information, monikers (aliases), and so on. If a particular item of data is required, but not found in a designated profile, user 203 may be prompted by WS 217 to submit the required snippet of data.

Of course, auto registration is intended to eliminate or at least reduce to a minimum the repetitive data-entry normally required to fill out numerous forms at different WEB-sites. Moreover, repetitive submission of user-chosen passwords, log-in codes, and user-names for site acceptance or denial can be eliminated. In a preferred embodiment user-names, log-in codes, passwords, and the like are generated and submitted by the auto-registration process. This can be accomplished under partial user direction, or it can be accomplished completely without user involvement. In the first case, user 203 may have a list of unused passwords, user-names, and/or log-in codes that were pre-chosen and stored along with profile information. In the second case, such submissions may be automatically generated and submitted according to form requirements and site rules wherein the user has no knowledge of the data even after successful registration. The second embodiment follows a scenario wherein passwords and the like are optionally managed by the password-all portal service of application Ser. No. 09/208,740.

Referring again to FIG. 10, all of the site data is passed to IS 221 over data network 206 (optional). In another embodiment the data is passed over shared bandwidth on backbone 207. IS 221 is responsible for request generation (RG). Applying all of the required site data, navigational data, and profile data, IS 221 creates a job-order (not shown) containing complete instruction for navigation, form filling, and data return. Applicable user data is encrypted when transferred over secure socket links (SSL) as is known in the art.

In a preferred embodiment job orders are written in eXstensible Mark-up Language (XML), however, this in not required in order to practice the present invention. Other suitable mark-up languages may also be employed. A completed job order is then passed to NS 223 over network 206 or backbone 207. NS 223 using AR software executes the job order according to instruction.

NS 223, executing a job order on behalf of user 203, navigates to WS 225, in this example, and submits data either directly from DBS 219 where it is stored, or from within the order itself The first case assumes that codes are used in the XML order that equate to actual values in DBS 219. In this case, the data is not released from DBS 219 until it is requested by NS 223 during the form-filling process. The second case assumes that the XML order includes the actual values. In this case, the portion of the XML order containing user information is encrypted before navigation.

After successfully registering user 203 to obtain services offered by WS 225, accepted log-in and any password data is returned to DBS 219 and written thereto as part of a new user-site block pertaining to that particular WEB-site or service. Such a site may now be included in future data-gathering and summary processes wherein auto-log-in is possible as described in cross-referenced application Ser. No. 09/323,598.

In a case wherein a site is already known to domain 205 and is already pre-configured for navigation and form filling, as is the case with WS 227, the process follows a different order. For example, user 203 would log-in to WS 217 (portal server) and receive his or her personal portal page as described above. User 203 may either select a service hosted by WS 227 from a presented list of services, or he or she may navigate to the actual WEB-site where an icon (PH) is visible, such as on a registration page of the site.

In some cases, a user may simply be browsing WEB pages and stumble upon a registration icon. By clicking on the icon, or a similar representation thereof, while visiting the site or while browsing a list of pre-configured sites within his or her portal page, the auto-registration process is automatically launched from within domain 205. The process is essentially identical, except that much of the required data such as site navigation data and form data is already known to domain 205. Therefore, several steps may be eliminated from the process as a whole. Moreover, a generic XML order may already exist for services hosted by WS 227 such that only the profile data generic to a specific requesting user need be added to the order.

It will be apparent to one with skill in the art that the method and apparatus of the present invention may be practiced in a variety of ways without departing from the spirit and scope of the present invention. For example, sites offering services may be pre-configured for auto registration services by domain 205 such as is the case with WS 227. In these scenarios, such sites and services may be researched and rated ahead of time as to quality of service including dependability, success rate, customer service capability, and so on. By performing much of the pre-registration research generally required of a customer wishing to register for any services, a customer may be put more at ease and may be more likely to do more business on the Internet. The fact that a third party, which is already trusted by users, performs auto registration extends that credibility to the particular site offering the services.

Still, a user may desire to find and register sites (WEB findings) that are not known to domain 205. As part of the service offered by domain 205, users understand and accept any risks posed by added sites as part of normal business. Registration by proxy on behalf of requesting users is possible for virtually any offered service that might be obtained through the Internet by interactive form.

Figure 11:
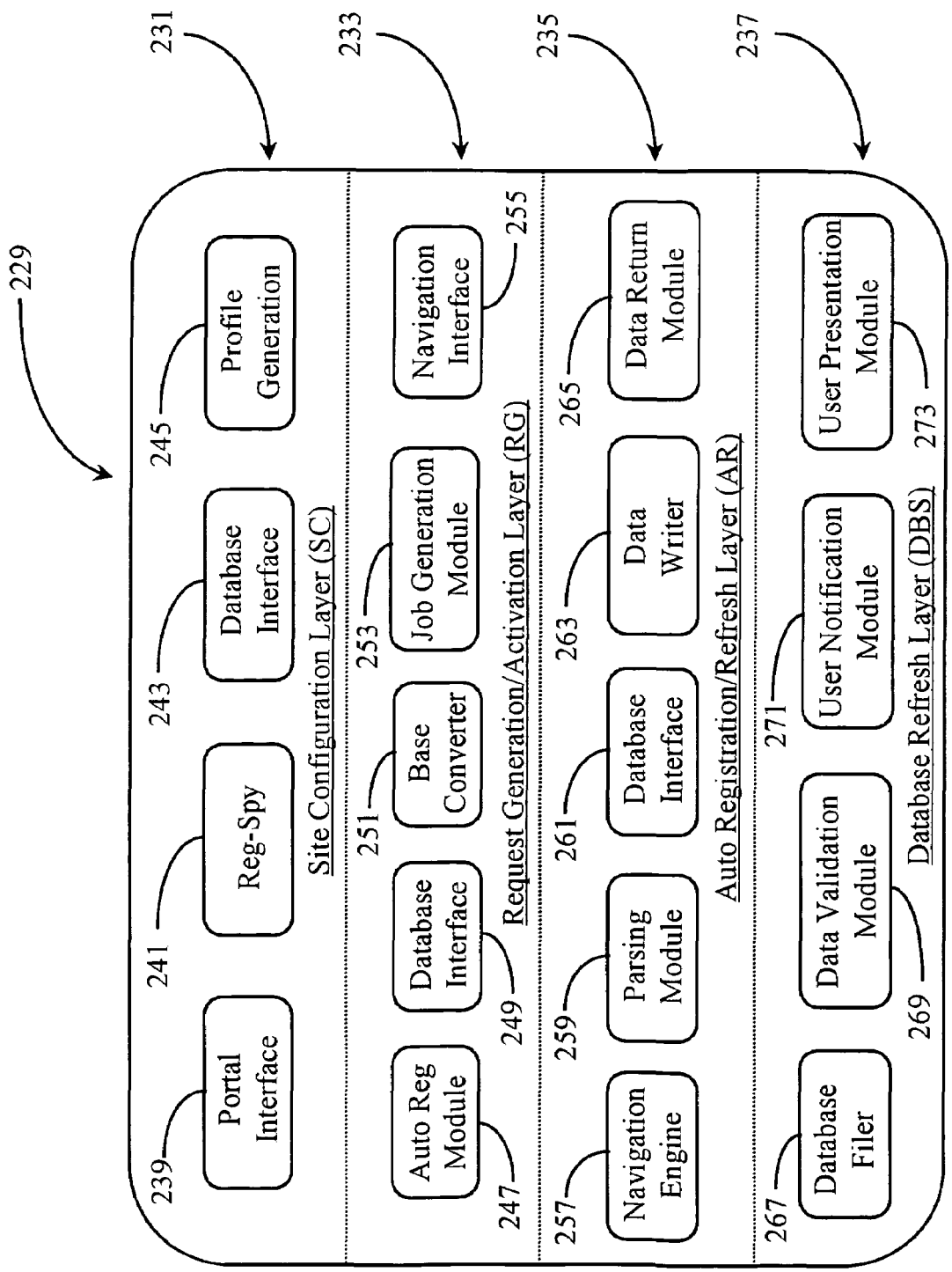
FIG. 11 is a block diagram illustrating software architecture of an auto-registration suite according to an embodiment of the present invention.

FIG. 11 is a block diagram illustrating software architecture of an auto-registration suite 229 according to an embodiment of the present invention. Suite 229 represents the server-distributed software components of FIG. 10 above. As previously described suite 229 may be divided to execute on a plurality of machines, or it may be provided on one powerful server. In this example, all described components are grouped by layer into one application or suite 229 for exemplary purpose only.

Suite 229 has a software layer 231, which is provided therein and adapted as a site-configuration layer (SC). Layer 231 is analogous to SC software illustrated on WS 217 of FIG. 10. Layer 231 has a portal interface module 239 provided therein and adapted to function as a user-interface for general portal services as well as an interface for services related to auto-registration services. For example, a user may first invoke module 239 in order to cause display of his or her portal options.

A registration spy (Reg-Spy) module 241 is provided within layer 231 and is user-accessible through portal interface 239. Reg-Spy 241 is a tool that enables a user to navigate to any service-offering site for the purpose of highlighting site forms and other associated data that is required for successful navigation and registration to a site or service. Reg-Spy 241 may be used to highlight a main registration form and description, as well as any secondary forms and descriptions required to receive secondary services, added services, optional services, or customized versions of main services. By default, the auto-registration service of the present invention will only register users to main services linked from pre-configured sites. However, a plurality of services, or options depending from a main service may be configured manually for auto-registration if desired.

A database interface module is provided within layer 231 and adapted for enabling bi-directional database communication with DBS 219 of FIG. 10. A profile generation module 245 is provided within layer 231 and adapted to enable a user to create and add a new user profile to a list of existing user profiles. Using module 245 in conjunction with module 243, a user may also edit existing profiles, or delete existing profiles. In this example, modules 241–245 are secondary modules available through portal interface module 239, however that is not specifically required in order to practice the present invention. For example, a user may log-in solely for the purpose of editing a profile, in which case, module 245 may be requested and presented as a first option after log-in. Similarly, module 241 may be requested as a first option after portal log-in. In normal practice of the present invention, various options would appear on a user's personal portal page as previously described.

Suite 229 has a software layer 233 provided therein and adapted for request generation (RG) and activation, as so labeled. Layer 233 provides function, which is analogous to the function of IS 221 of FIG. 10. Layer 233 has an auto-registration module 247 provided therein and adapted as a software mechanism for initiating a request generation process for registration to a particular WEB-site. Module 247 may also be provided within layer 231 without departing from the spirit and scope of the present invention. For example, a number of pre-configured services may be listed and accessible from interface 239 wherein one may be selected and then activated to target level by invoking a list-associated module 247 thereby launching the request generation process.

Layer 233 has a database interface module 249 provided therein and adapted for bi-directional database communication as described above with module 243. Within layer 233, module 249 allows access to DBS 219 of FIG. 10 for the purpose of verifying that all of the required data is available at the time of request generation. It is noted herein that profile data held in a user profile is not necessarily configured for insertion to a particular form according to site rules. Therefore, a base converter module 251 is provided within layer 233 and adapted to "convert" profile data to a form acceptable to required form fields using the applicable format required by the target site at the time of registration.

Base converter module 251 may also comprise several sub-modules (not illustrated), which are adapted to handle specific types of data. For example, age requirements may be handled by a "birthday converter", financial payment data may be handled by a "payment converter" and so on. Module 251 is responsible for formatting available data according to site and enterprise rules. As such, input and output dependency tables are employed as a method of understanding various requirements for data formatting.

In order for the service in an embodiment of the present invention to register a user to a site, it must first obtain all of the service-dependent profile fields required for successful registration at a particular site/service. To accomplish this, all of the required site-specific forms must be obtained along with all of the site-specific fields contained therein, as well as the specific data-format requirements for each field. This is accomplished during site configuration using module 241.

An input dependency table is created listing all of the user fields and format requirements needed by a particular site for registration. A second list is obtained that contains all of the user fields of the input dependency table that a user already has stored in his or her profile data table. Such a table may hold items that are used in different profiles such that the list is a compilation of all of the stored data items repeated throughout several separate profiles without repeating one of the data items.

By comparison then, a list of fields missing data is developed if there are any. If there are no required fields missing data, a request may proceed from WS 225 to IS 221. Converter module 251 insures the data is properly formatted for site-specific rules. If data is missing from a user profile, then the user is prompted to supply the missing data.

The job of converter module 251 is to map user data into a format accepted by a particular form. For example, a user profile format for a full name may read last name, middle name, and first name. This format is widely recognized in many formal applications however, some sites will require a first name followed by a last name with no space for a middle name or initial. Using Reg-Spy tool 241, a user has highlighted the target form-field, and the rules that apply. Therefore, at the time of request generation in layer 233, converter module 251 has the required format requirements for that specific section of data. When accepting user information for profile generation, the service may ask for more than is typically required on most forms. In this way, the chance that a user will be required to add something after a request generation has initiated is minimized.

Layer 233 has a job-generation module 253 provided therein and adapted to write a functional XML instruction order containing all of the required data for navigating to and registering a user to a particular service. Base converter 251 supplies all of the re-formatted (if required) user-data to module 253 for inclusion into the order. A job order will contain a site-navigation template, an auto-login block (if required), and user data or a reference to the appropriate user data to submit to site forms required for registration purposes. A test module (not shown) may be built into an XML order generated by module 253 such that form filing may be rehearsed for accuracy before actually submitting the data to a site. Such a test module may instead be provided as part of Reg Spy 241. Once an XML order is deemed correct and is ready to execute, it is passed on to a navigation sub-system through a navigation interface module 255.

After data conversion and all other requirements are satisfied, an XML job order written by module 253 will resemble the following exemplary order.

```
<register url="http://lc2.law5.hotmail.passport.com/cgi-
bin/tos.cgi?us=hotmail&_lang=&beta=">
    <form>
        <action type="fill_and_submit" actionArg="Submit.x">
            <keywords>Profile Information</keywords>
        </action>
        <field type="OPTIONS" name="month">
            <value>03</value>
        </field>
        <field type="PASSWORD_CONF" name="passwd1">
            <value>5cacb3cb76ab4e7996aff6fa630412e4</value>
        </field>
        <field type="OPTIONS" name="day">
            <value>31</value>
        </field>
        <field type="TEXT" name="xage">
            <value>21</value>
        </field>
        <field type="OPTIONS" name="xoccupation">
            <value>un</value>
        </field>
        <field type="LOGIN" sendback="1" name="reglogin">
            <value>ji</value>
            <value>yodleeuser</value>
            <value>ji34</value>
            <value>yodleeuser43</value>
        </field>
        <field type="PASSWORD" sendback="1" name="passwd">
            <value>5cacb3cb76ab4e7996aff6fa630412e4</value>
        </field>
        <field type="TEXT" name="xfname">
            <value>Ji</value>
        </field>
        <field type="TEXT" name="xlname">
            <value>Lee</value>
        </field>
        <field type="TEXT" name="xzip">
            <value>94086</value>
        </field>
        <field type="RADIO" name="xgender">
            <value>m</value>
        </field>
    </form>
    <form>
    <action type="reset_auto_reg" actionArg=" ">
        <keywords>someone has already selected</keywords>
    </action>
    </form>
    <form>
    <action type="fill_and_submit" actionArg="I Accept">
        <keywords>MSN HOTMAIL TERMS OF SERVICE</keywords>
    </action>
    </form>
    <form>
    <action type="reset_auto_reg" actionArg=" ">
        <keywords>Hotmail Registration</keywords>
        <keywords>Sign-In Name contains reserved or ineligible word</keywords>
    </action>
```

```
        </form>
        <form>
    <action type="success" actionArg=" ">
        <keywords>Sign Up Successul</keywords>
    </action>
        </form>
        <form>
    <action type="reset_auto_reg" actionArg=" ">
        <keywords>Sign-In Name already in use</keywords>
    </action>
        </form>
</register>
```

The exemplary order shown above has been slightly altered in indentation for some lines to compensate for page margin. One with skill in the art, however, will recognize the proper XML format. It is also noted herein that values listed in the order do not contain actual data, but coded equivalents to the data as registered in DBS 219 of FIG. 10. In this embodiment profile data is only pulled when required for submission as previously stated. In this way, security is enhanced and the actual order may be condensed. In one embodiment metadata may be inserted into value fields contained in a job order.

Suite 229 has a software layer 235 provided therein and adapted for auto-registration (AR) and data refresh. Layer 235 is responsible for navigating to a target WEB site and submitting registration information to the site on behalf of a requesting user. Upon successful registering, layer 235 is also responsible for the return of confirmation and log-in information to a user and database Layer 235 has a navigation engine 257 provided therein and adapted to navigate to a target WEB-site based on navigation instruction contained in a job order generated in layer 235. Navigation engine 257 may navigate to any site or series of sites specified in the associated job order. Engine 257 also performs auto-log-in procedures when required. A parsing module 259 is provided within layer 235 and adapted to parse information from selected portions of WEB pages during navigation. Therefore, module 259 works in conjunction with and may be a part of engine 257.

It is taught in the cross-referenced application entitled "Method and Apparatus for Retrieving Information From Semi-Structured, WEB-Based Data Sources", that a parsing function parses all data from user-highlighted sections or blocks of data contained in target WEB-pages from which meta-summaries will be compiled. The parsed data is compared to user-input data regarding the nature of the data request. When parsed words match keywords contained in the request, the associated data is returned.

Parsing module 259 operates in much the same way in that it looks for page keywords, and form requirements highlighted by a user during pre-configuration. Once a page and section (form) has been identified, registration action continues as specified by the job order generated in layer 233. A database interface 261 is provided within layer 235 and adapted to allow bi-directional communication to DBS 219 of FIG. 10. In this way, the appropriate data may be ordered for submission.

A data writer module 263 is provided within layer 235 and adapted to transfer the appropriate data into the appropriate form fields in the format required by the particular form. At this point, a completed form is submitted to a service-hosting site. In some cases, chosen user-names, log-in codes, etc. will not be accepted by a site. It may be that another user has already chosen a particular name. In this case, a retry attempt is initiated using a different value either generated by the service, or pre-chosen by a user as previously described.

A data return module 265 is provided to return successful registration information including user notification thereof and record of successful and accepted values submitted for future log-in purposes. In some cases, accepted values may be immediately used by the service to log-in on behalf of a user and to obtain data from the site for a user if directed to do so by XML order.

Suite 229 has a database refresh layer (DBS) 237 provided therein and adapted to accept return information from layer 235 for the purpose of recording the information for future use. A database filer module 267 is provided within layer 267 and adapted to create a new member item for user 203 (FIG. 10) and to write the returned data thereto. In this way, the new site is included in a list of user-registered sites for data gathering and summary presentation taught in the cross-referenced applications.

A data validation module 269 rechecks all data written into DBS 219 (FIG. 10) and supplies any new data to an input dependency table described previously. In some cases, some user-supplied data will not be valid after a successful registration. For example, if a phone number or other temporary information is supplied in conjunction with registration to a service, it may be deleted after it is no longer needed for registering. One example would be that of a temporary site registration. In this case all of the new data supplied for use with a temporary site registration may be purged from DBS 219 after the time period allotted for the service has expired. Such a service may be a limited free period of technical support for a purchased product or the like.

A user notification module 267 is provided within layer 237 and adapted to notify a user upon successful registration and in some cases failed registration attempts. It may be that a site disqualifies a particular user from registration based on information such as credit rating or some other criteria. In this event, a notice would be sent to the user. A user presentation module 273 is provided and adapted to present any summary or refresh data to a user if it was requested before registration. Such data may be returned along with registration confirmation and log-in data. Module 273 is also used during normal summary gathering operations after registration and inclusion of the target site into a user's list of registered sites.

It will be apparent to one with skill in the art that the software components contained in layers 231–237 of suite 229 may vary in number and description without departing from the spirit and scope of the present invention. For example, instead of multiple database interfaces, one database interface may be provided for a suite 229 that is running on one server. Moreover, layer 235 may comprise more than one of each described function for situations wherein an XML order is split or distributed among several navigation, auto registration, and data gathering applications, combined to define "gatherers" as termed by the inventor. An example would be that of a single XML order containing a plurality of URL sites and registration requirements for several of the included sites. Separate gatherers may be used to execute several actions contained in the order. The inventor intends that the example presented herein represent just one possible software-architecture that may be used to practice the methods of the present invention.

As previously described, the layered structure illustrated herein with respect to layers 231, 233, 235, and 237 and components represented therein may be distributed in parts over various servers, or contained as one application running on one machine. There are many possibilities.

Figure 12:
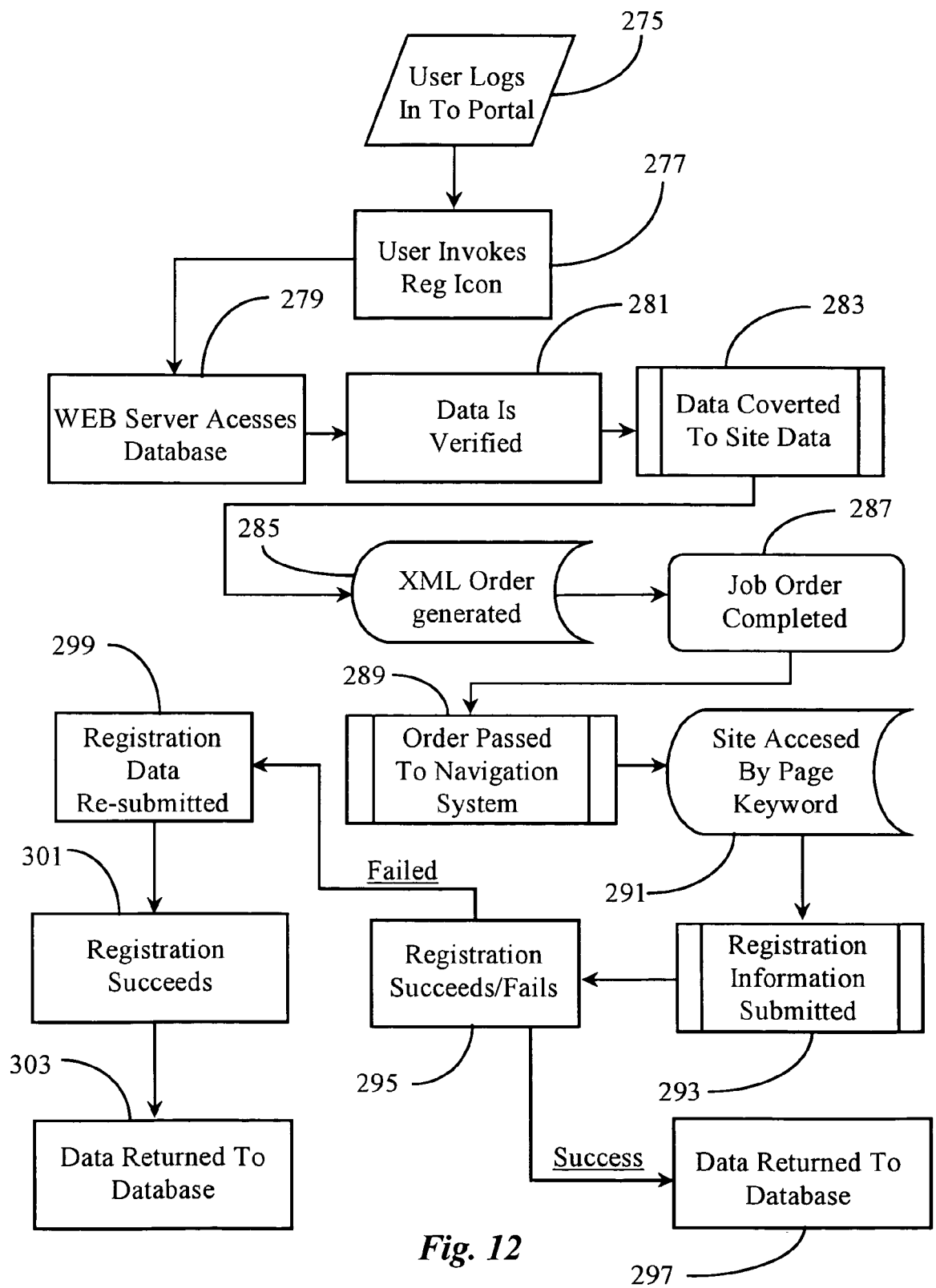
FIG. 12 is a process flow diagram illustrating various process steps for auto-registration to a site and receiving data from the site according to an embodiment of the present invention.

FIG. 12 is a process flow diagram illustrating various process steps for auto-registration to a site and receiving data from the site according to an embodiment of the present invention. At step 275, a user logs-in to a portal server to obtain portal services. In this step a portal page is downloaded to the user. It is assumed in this example that all site pre-configuration is complete and all data is available for navigation and registration purposes. It may be that the user is adding a new site or sites that are not pre-known to domain 205. It may be that site or sites selected by a user are pre-known to domain 205. In some instances, it may be a combination of the above. In case of any of the above conditions, a user invokes an auto-registration icon at step 277. Profile selection, as described above, is part of the pre-configuration process and therefore, not represented in this process flow.

In one embodiment a separate registration icon is associated to pre-configured WEB-sites (one per) appearing in a list of service-offering sites on a user's portal page. In another embodiment one registration icon is invoked after a user has selected more than one service-offering site for registration. In still another embodiment, a user may come across such an icon while normally surfing the Internet, at which time he or she may invoke it to launch an automated registration process.

At step 279 the portal server of step 275, also termed a WEB-server accesses a database to check if all of the information about the user is available. It is assumed in this example, that all data is available. If some data were not available, a user would be prompted to submit it. At step 281 user profile data and acquired site data is verified as authentic. In this step, codes may be assigned to stored data for latter retrieval based on such codes. At step 283, user data is converted to site data with respect to any format required by site-specific form-fields. At step 285, an XML order is generated based on all required data to complete a proxy navigation and auto-registration process.

At step 287, the job order generated in step 285 is deemed complete. This step may include data verification and a self-test sequence to insure that all of the user data can be correctly mapped into the appropriate form fields. If an error occurs during a self-test sequence, then a user is notified of the error and an attempt to correct the error is initiated.

Once a job order is deemed complete, it is passed to a navigation sub-system in step 289. The navigation system receives and executes the job order according to instruction. At step 291, a target WEB-site is accessed according to navigation instruction and page keywords. Page keywords are used to verify the exact page containing the required form for form filling.

In one embodiment part of the job order described above contains a DTD template interwoven into site logic as described in FIG. 8 above. Using this method allows a form to be located based on HTML data-structure matching. The target form is highlighted during pre-configuration and a DTD is produced for that section and for the URL wherein the section resides.

At step 293, a target form is populated with the appropriate user data and submitted. This is accomplished according to the action portion of the job order. At step 295, the registration attempt of step 293 either succeeds or fails. If in step 295, a form is accepted, then in step 297, the appropriate data and confirmation is obtained and returned.

If in step 295 the registration attempt fails, an attempt to determine the reason for failure is initiated. In this step, notification may be sent to a user explaining the given reason for failure. It may be that the user just does not qualify for registration to the target site or service. It may be that an error has occurred with respect to data submitted such as a credit card number is invalid or expired. In most cases however, failure on a first attempt will likely be the result of another user already possessing a submitted password, user-name or log-in code.

If a failure notice is displayed by a target service to the navigation system, it may be parsed for content with notification sent back to a user. In this case, a user may be required to update his or her selected profile with correct data, or select an alternate profile and re-initiate the process.

If the failure notice involves submitted passwords or the like already being taken, a re-try using new data is attempted by default. This is represented by step 299. This step may be repeated many times as new data is obtained to replace data rejected by a site. As previously described, user-names, passwords, and log-in codes may be supplied in the form of a list selected and approved by a user, or may be generated at the time of form population. In step 301, registration succeeds and in step 303, the accepted password and log-in data along with confirmation data is returned to a user.

It will be apparent to one with skill in the art that the process described herein may contain additional steps and sub-steps without departing from the spirit and scope of the present invention. For example, step 291 may contain a series of sub-steps such as parsing, structure matching, and so on. As well, processes related to registration error, user notification thereof, data correction and re-submission may be tailored somewhat based on the type of error communicated.

The method and apparatus may be practiced with a wide variety of interactive forms other than site registration forms without departing from the spirit and scope of the present invention.

API Software Bundle

It was described in the background section that a truly automated navigation system requires various APIs in order to extend functionality of a proxy browsing application with a variety of Java-based programs, known to the inventor. It is intended by the inventor that such an enhanced browser application can perform navigation, authentication, and data downloads on behalf of a user without active input by that user. Such an application is spawned and controlled within the navigation system such that a spawned instance performs solely on machine-readable instruction language.

Figure 13:
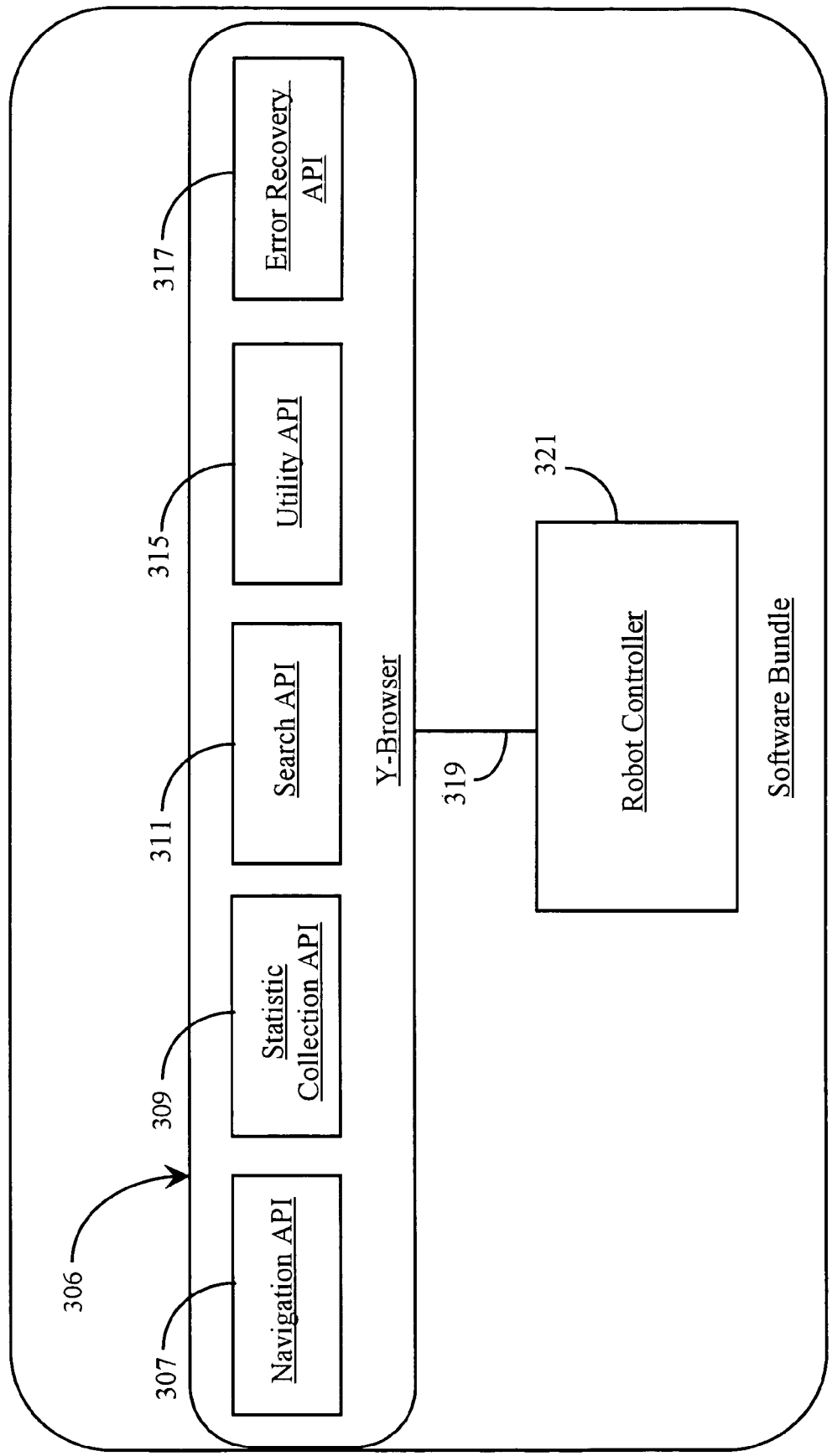
FIG. 13 is a block diagram illustrating an overview of application-program-interface (API) and control software bundle according to an embodiment of the present invention.

FIG. 13 is a block diagram illustrating an overview of application-program-interface (API) and control software bundle 305 according to an embodiment of the present invention. Software bundle 305 incorporates two main components. These are a Web-browsing application 306, termed a Y-browser by the inventor, and a software control application 321 termed a robot controller. Y-Browser 306 represents an instance of proxy browsing software capable of fully automated function and taking its instruction from machine-readable language. Controller 321 manages multiple instances of Y-browser 306 although only one instance is shown in this example.

Y-browser 306 contains a plurality of APIs for integrating browser 306 to a plurality of functional Java-based programs, which are not illustrated in this example, but which are described below. Each API described herein is categorized according to function with each controlling a plurality of Java-based functions, which may be thought of as extensions to browser application 306. For example, navigation API 307 is provided within browser 306 and adapted to provide automation to functional programs that perform such as auto-login and authentication, hyperlink invocation, form filling and submission, data downloading, and the like. A statistic collection API 309 is provided within browser 306 and adapted to provide automation for programs designed to return statistical information for the purpose of monitoring, timing of operations, and other like functions.

Search API 311 is provided within browser 306 and adapted to provide automation to functional programs that perform a variety of search operations such as obtaining a data-structure tree of a particular web page, often referred to as a document object model (DOM). Other operations include searching for specific patterns on a web page, searching for an image in a web page, searching for tables containing text as a row or cell element, and so on.

Utility API 315 is provided within browser 306 and adapted to provide automation to functional programs that perform duties such as parsing date functions displayed in numerous formats and returning such functions according to an ordered format, parsing money functions displayed in numerous formats and returning such functions according to an ordered format. API 315 also provides automation to various encryption and decryption utilities. An error-recovery API 317 is provided within browser 306 and adapted to provide automation to a variety of programs designed to recover errors or tolerate faults. For example, one such program monitors the loading time of a web page and adjusts a timeout interval if necessary. Also, error recovery programs are provided for such as retrying auto login and other navigation functions if the failure is a first result of a code first attempt.

Robot controller 321 provides management and instruction to browser 306 as described above. For example, controller 321 controls the number of instances of browser 306 that are running and any given period of time. Controller 321 continually monitors the behavior of instances of browser 306 and looks for suspicious behavior such as erratic performance. If a particular browser application 306 does not respond or return status for more than a set time it will be terminated, and any new instance will be spawned by controller 321.

One with skill in the art will recognize that there may be more APIs provided within browser 306 than are illustrated herein without departing from the spirit and scope the present invention. The inventor has chosen to illustrate just five of the more important APIs with regards to automating function and in some cases, providing additional function. The Java-based programs that were generally described in this example may be assumed to be part of the normal function of browser 306. Controller 321, which is a software application, is intimately integrated with browser 306 and all of its APIs. It is noted herein that APIs referred to in this specification are intended to provide automated extensibility to browser 306 for accessing and utilizing the many Java-based routines that are used during navigation on a network. In this regard there are many possibilities for automating routines specific to a browser as well as interfacing with and providing automation to many external Internet-based applications as well as new routines and applications which are not conceived yet in the prior art.

Figure 14:
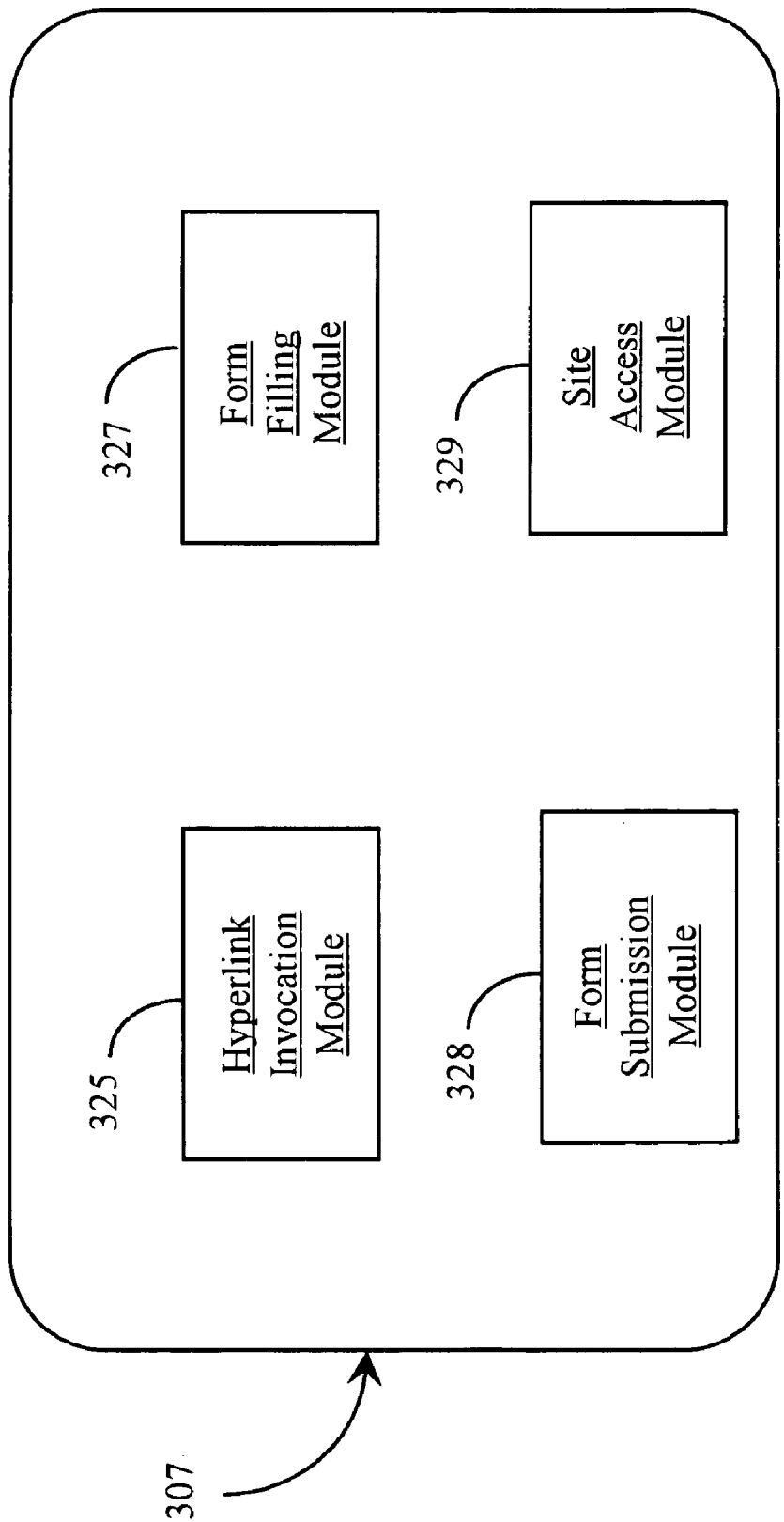
FIG. 14 is a block diagram illustrating function of the navigation API of FIG. 13.

FIG. 14 is a block diagram illustrating function of navigation API 307 of FIG. 13. Navigation API 307, as described above, is responsible for providing automation to the many functions used in Internet navigation. A hyperlink invocation module 325 is provided and represents a Java-based set of routines for automatic invocation of such as web page anchors, embedded links to other web pages, image links, interactive windows, and other types of multimedia hyperlinks. Module 325, as one with skill in the art will recognize, is defined by function to the extent of programming. For example, a Java routine for invoking a link to an alternate web page is a separate routine or string from one for invoking an image on a web page. However, many such routines may be included within module 325. The exact function of module 325 will, of course, depend on the machine-readable instruction, which is part of a job order being executed by the browser application (306) described in FIG. 13 above. API 307 then, emulates all user input actions, which would normally be associated with manual browsing. Thus, it can be seen that API 307 provides automated extensibility to browser 306 (FIG. 13) when executing module 325 according to any existing instruction that is part of a running job order.

The relationship described above is true with all browser functions that would normally require some user interaction. For example, a site-access module 329 is provided and represents a plurality of Java-based routines for accessing a web site. Such routines may include an auto login sequence, and authentication routine, a display frames sequence, an ignore frames sequence, and so on. It is important to note that functional modules such as 325 and 329 are used typically in a logical order. Therefore, module 329 would be invoked before module 325 when accessing a web page. Furthermore, depending on instruction, functional modules may be alternately used to perform given functions in a stated order as directed by a running job order.

A form-filling module 327 is provided and adapted to enable various interactive forms to be populated with data. Such forms could include registration forms, purchase-order forms, software download forms, and the like. Data for filling forms, of course, are part of the running job order. In one embodiment such data may be accessed during a pause in a running job order. A form submission module 328 is provided and adapted to invoke submission of an interactive Web form upon completion thereof.

It will be readily apparent to one with skill in the art that there may be many more functional modules provided and interfaced to browser 306 (FIG. 13) by virtue of navigation API 307 then are illustrated in this example. The inventor intends that the functional modules 325 through 329, illustrated are exemplary only. Modules 325 through 329 represent just a few examples of many possible functional modules representing functional Java-based routines that may be executed from instruction contained in a job order.

Figure 15:
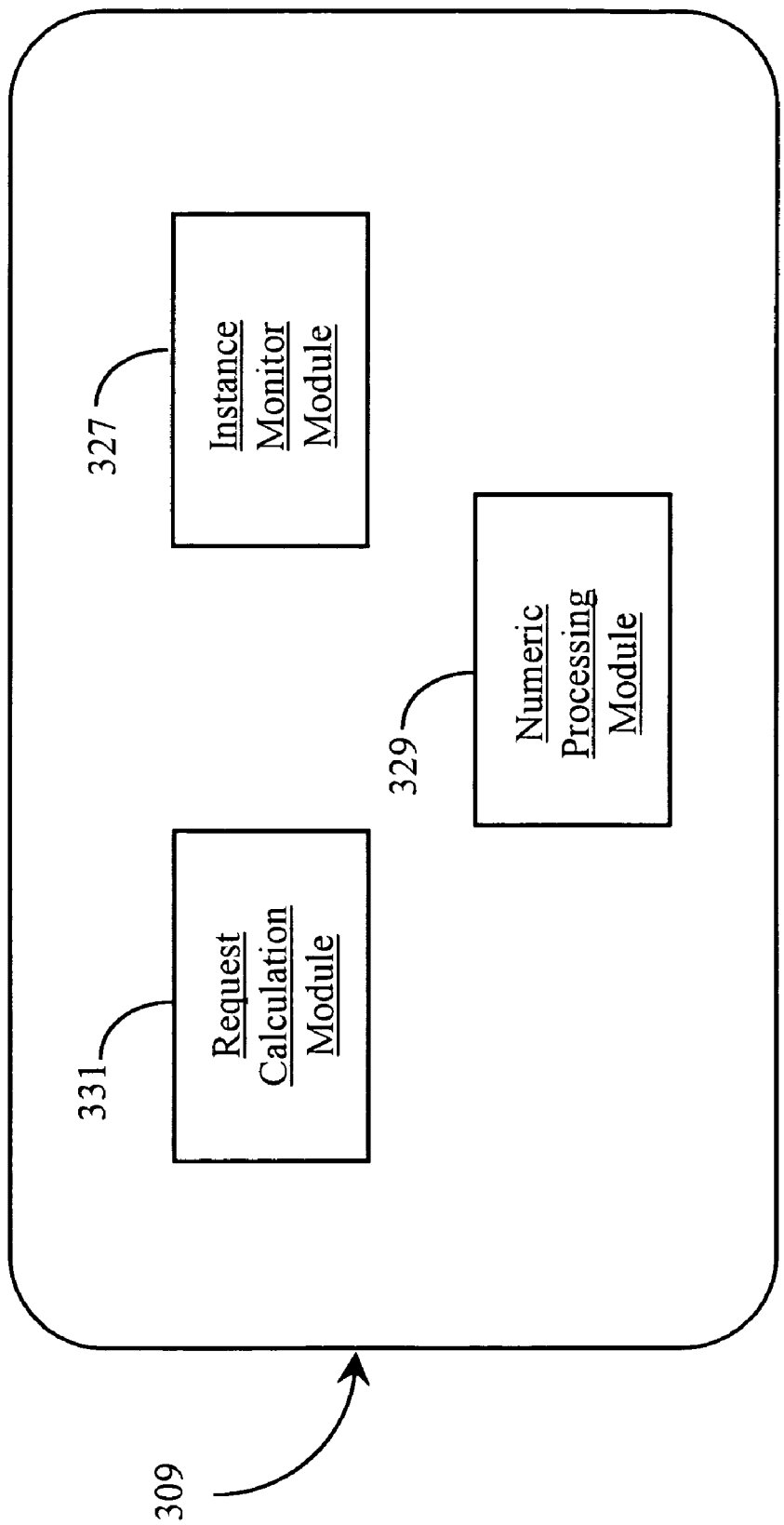
FIG. 15 is a block diagram illustrating function of the statistic-collection API of FIG. 13.

FIG. 15 is a block diagram illustrating function of statistic-collection API 309 of FIG. 13. Statistic-collection API 309, hereinafter referred to as stat 309, is provided to enable automation to various Java-based routines having to do with error correction and recovery. A request calculation module 331 is provided and adapted to a number of requests existing in any given navigation session. Statistical information such as this may help to predictably estimate a time period representing the duration of a particular session. A numeric-processing module 329 is provided and adapted for the processing of various numbers related to certain states of browser 306 (FIG. 13). For example, it may be desired to monitor the data rate of data download from a particular web page by a particular instance of Y-browser. An instance-monitor module 327 is provided herein and adapted to monitor function of the immediate instance of Y-browser. Such functions as response time, length of spawn-state, ratio of execution to error rate, and so on.

In this particular example, modules 327 through 331 report browser status back to controller 321 of FIG. 13. Controller 321 in return manages browser 306 (FIG. 13) according to feedback. It will be apparent to one with skill in the art that certain monitoring and statistic-collecting functions may help streamline a proxy-browsing system as a whole and as practiced on a network on behalf of many users. The exact modules used, and which ways there may be integrated for obtaining and returning statistical information well, of course, depend on programming preferences. There are many possibilities.

Figure 16:
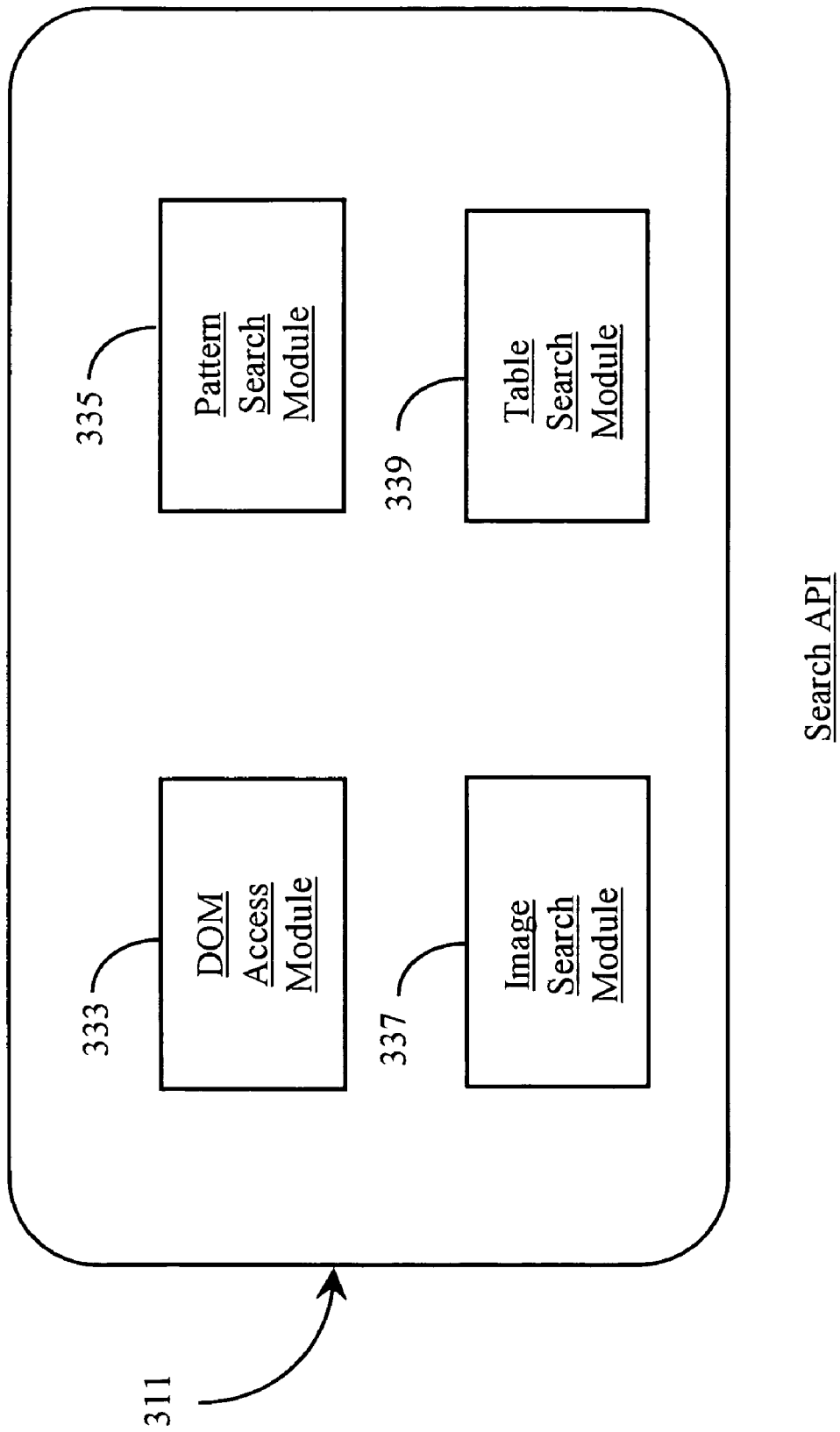
FIG. 16 is a block diagram illustrating function of the search API of FIG. 13.

FIG. 16 is a block diagram illustrating function of search API 311 of FIG. 13. API 311, as described above, is responsible for providing automation to a plurality of disparate search functions. A DOM access module 333 is provided herein adapted to access the data structure associated with a particular web page. Such a data structure will be representative of how all data is represented on the given web page. This technique is used to aid in searching for text that is repetitively associated with specific parts of a data tree. A pattern-search module 335 is provided and adapted to search for repetitive patterns embedded within Web pages. An image-search module 337 is provided and adapted to perform the process of seeking out and identifying images within Web pages. A table-search module 339 is provided and adapted to perform the process of seeking out and identifying text tables within a Web page. Still other search modules may be provided and adapted to perform other types of searches. For example, a search application known to the inventor utilizes secondary search functions that may be embedded within a web page thereby launching a second search with the parameters used in the first search.

It will be apparent to one with skill in the art that modules 330–339 may be programmed to cooperate with one another without departing from the spirit and scope of the present invention. For example, instructions for invoking a wide variety of functional modules illustrated in this example and in the previous figures may be provided as one interleaved instruction (job order), which may be provided through robot controller 321 of FIG. 13, or may be communicated in another way to Y-browser 306.

Figure 17:
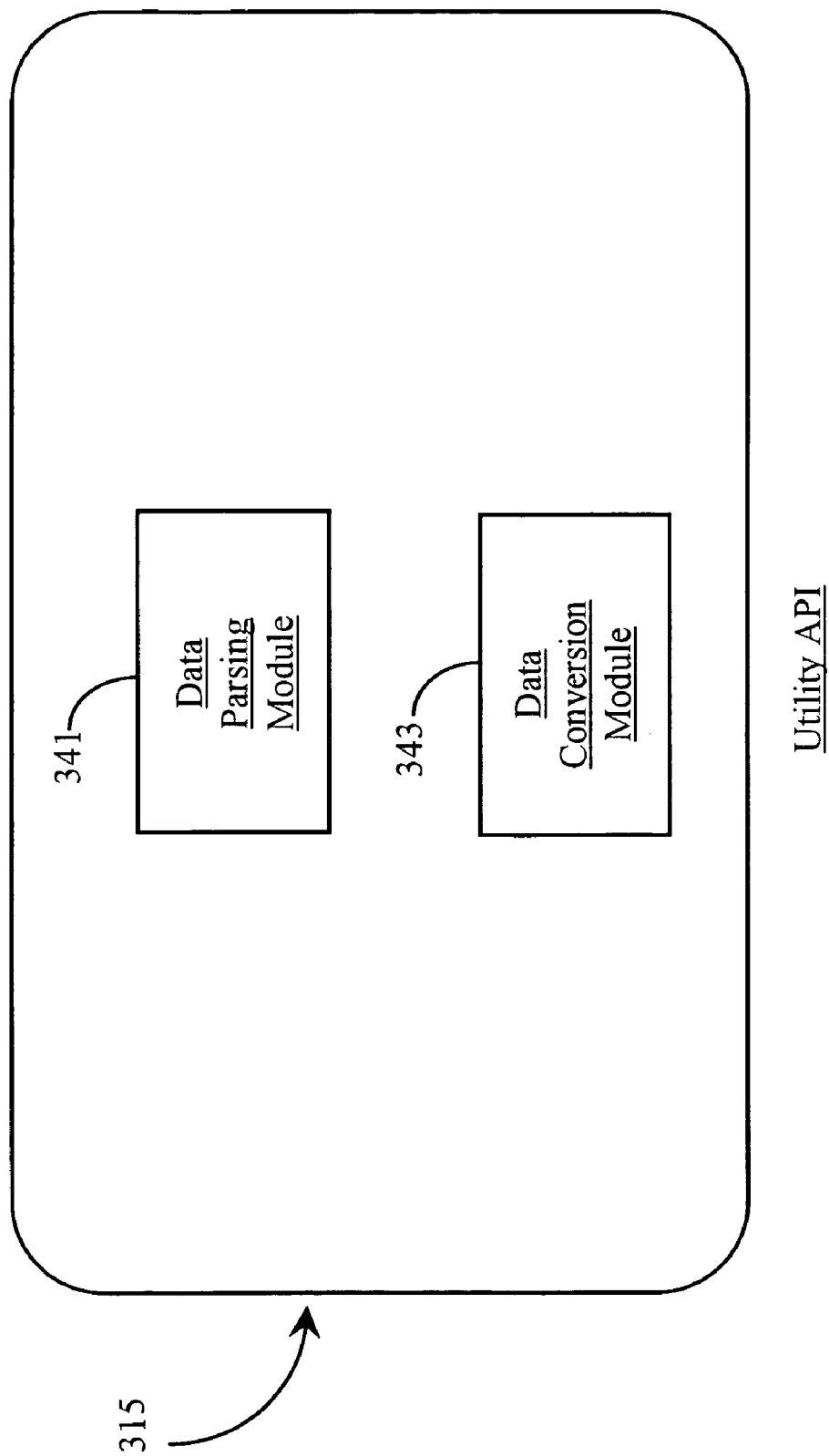
FIG. 17 is a block diagram illustrating function of the utility API of FIG. 13.

FIG. 17 is a block diagram illustrating function of utility API 315 of FIG. 13. As previously described above utility API 315 is provided to enable automated function of modules designed for manipulating, restructuring, and returning data in proper formats. A data parsing module 341 is provided and adapted to parse data found embedded in a particular web page. A data conversion module 343 is provided and adapted to convert or restructure applicable data for return to a user. Module 341 is used to parse date functions, money functions and other numerical representations that may be presented in a variety of formats. In this example module 341 is represented as a single module capable of multiple functions. In actual practice, a variety of sub-modules not shown may be included within module 341, the sub-modules responsible for parsing data displayed in various formats and returning the data to a user in a requested format. Other functions may be included within utility API without departing from the spirit and scope the present invention. For example, encryption/decryption programs known to the inventor may be included as functional programs that are executed in an automated fashion at appropriate sequences during navigation and data transfer operations.

Figure 18:
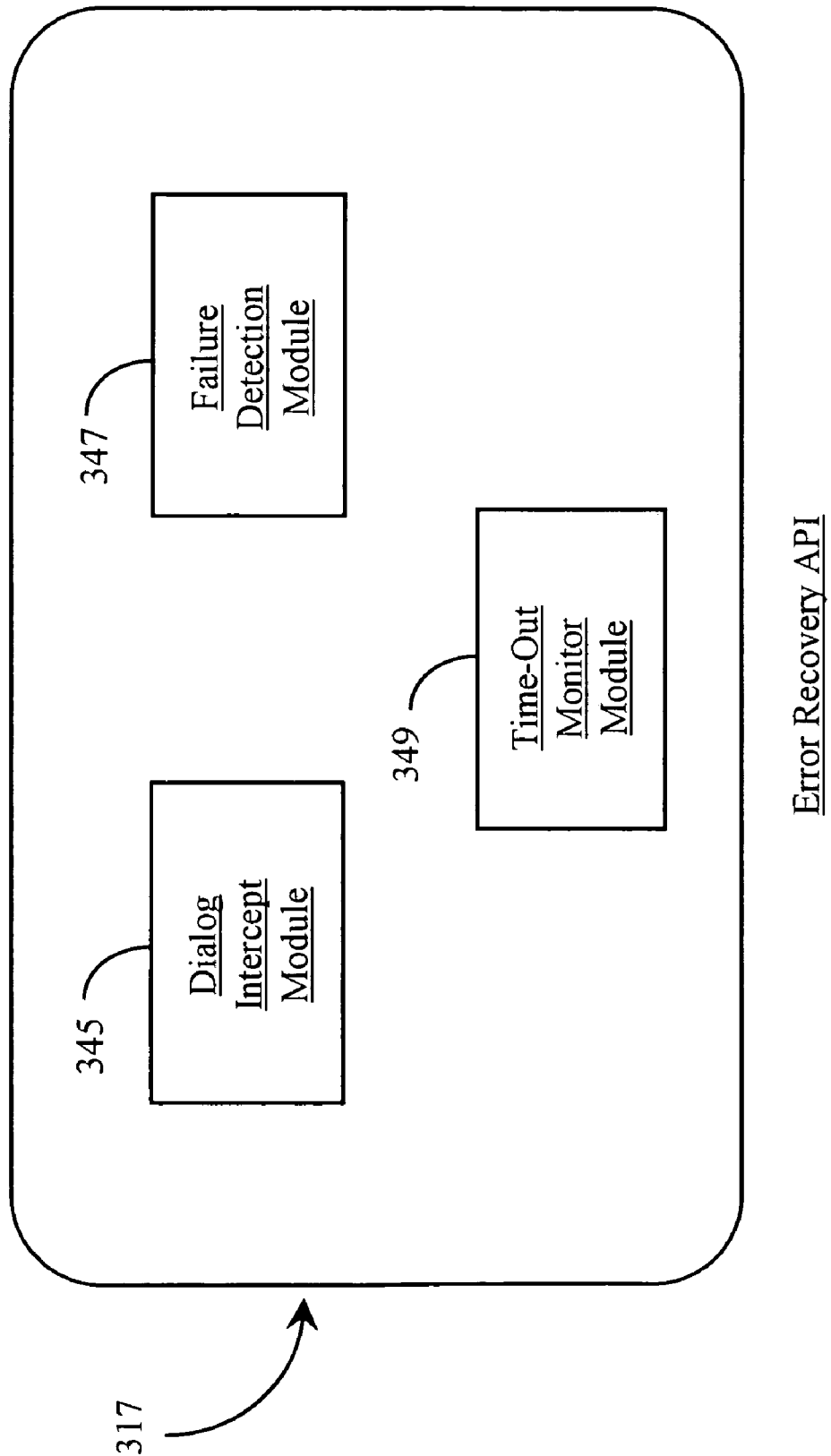
FIG. 18 is a block diagram illustrating function of the error-recovery API of FIG. 13.

FIG. 18 is a block diagram illustrating function of error-recovery API 317 of FIG. 13. API 317, as previously described, provides automated functionality to Java-based programs that deal with monitoring function, failure detection, and other types of error-recovery operations. A dialog-intercept module 345 is provided and adapted for intercepting and utilizing error messages that would normally be sent to a user operating a manual browser. Module 345 disseminates such error messages and then initiates an appropriate operation or operations for correcting the error state or states defined by the particular message. A failure-detection module 347 is illustrated and adapted to detect operation-sequence failures such as failure to Log-in, failure to submit form, failure to load page, and many other types of operation failures. A time-out monitor module 349 is illustrated herein and adapted to monitor the amount of time it takes to perform certain operations such as loading a web page. For example, if a Web page is taking a particularly longtime to load, module 349 may report the delay and may, and some instances, adjust the time-out period in browser 306 to allow more time for loading Web pages. Data reported back by error detection programs is used to make adjustments and/or to attempt to correct initial error states.

Will be apparent to one with skill in the art, that there may be many more error reporting or detection modules than are illustrated in this embodiment without departing from the spirit and scope the present invention. The inventor chooses to illustrate three such modules and deems these are sufficient for the purpose of explanation of the present invention. There are many possibilities.

The APIs and associated programs described above share a relationship that is one of integration with certain other APIs and programs. For example, an entire navigation sequence performed on behalf of the user they contain many user requests covering a plurality of Web sites. A running job order contains all of the instructions required for invoking and executing all of the required modules for successfully completing the order.

The described programs are, in preferred embodiments, integrated into browser application 306 of FIG. 13. Each described API provides the functionality for integrating the described programs with the instruction mechanism controlling a navigation sequence. In addition, each described API may be further broken down into smaller APIs under a same class of the APIs. For example, search API 311 may be broken down into smaller search APIs that provide automation and functionality to certain and specific data-search operations. Statistic-collection API 309 may be broken down into smaller APIs, which provide automation and functionality to a variety of statistic-collection programs.

It will also be apparent one with skill in the art, that in some instances, an API will simply integrate known browser functions to an automated instruction set such that a user's input is bypassed. The software bundle of the present invention accomplishes this in addition to providing unique functionality to browser 306 by interfacing unique programs with an automated functional set of instructions (job order). In this way, many complex tasks may be performed on behalf of a user in a truly automated fashion from beginning to end.

Figure 19:
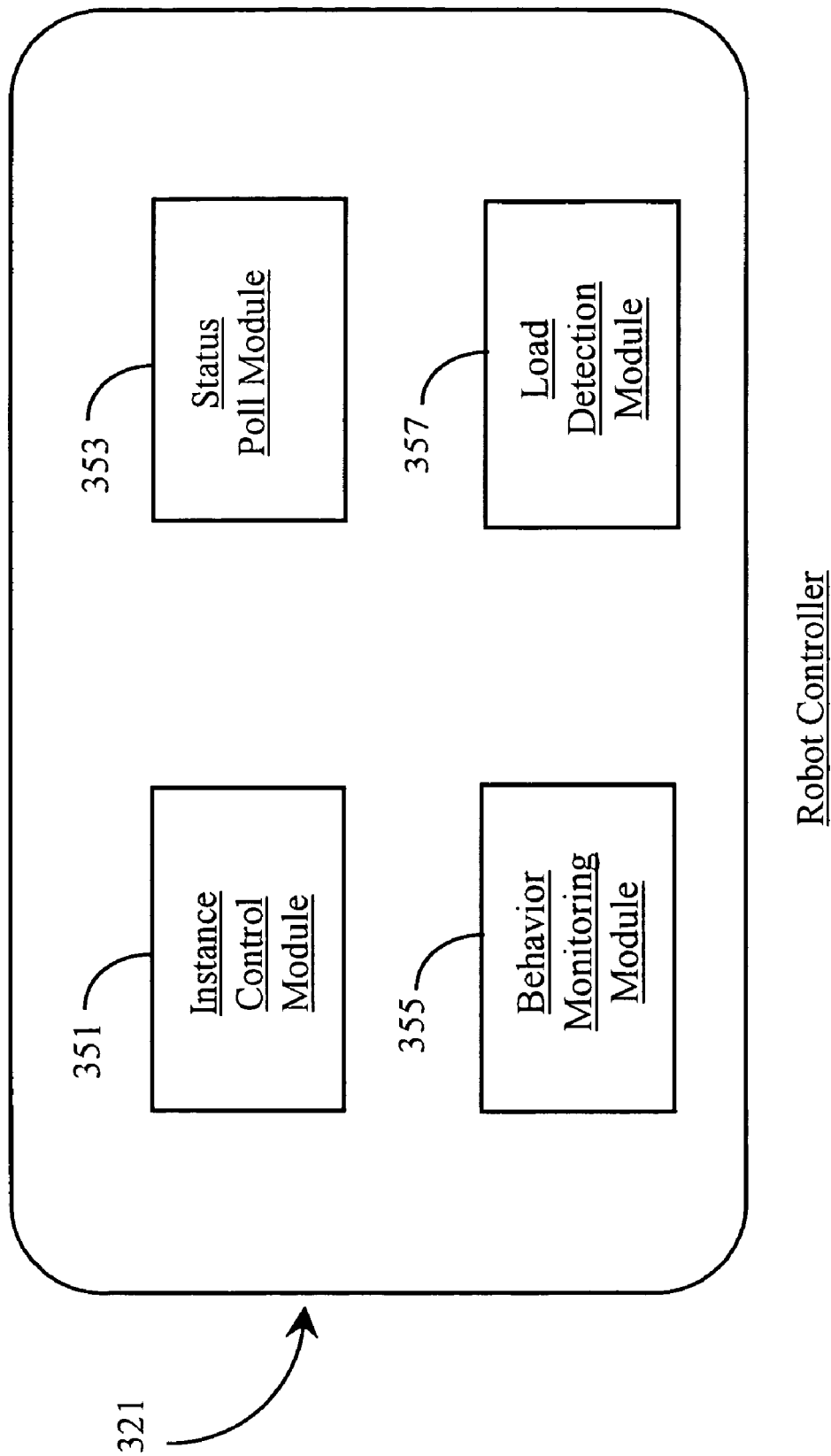
FIG. 19 is a block diagram illustrating a robot controller according to an embodiment of the present invention.

FIG. 19 is a block diagram illustrating a robot controller 321 according to an embodiment of the present invention. Controller 321, as earlier described, provides management and control to a plurality of running instances of Y-browser. Controller 321 is a software application that is capable of spawning and terminating instances of browser 306 (FIG. 13). Controller 321 may, in some embodiments, also provide the instructional sets for each instance of Y-browser spawned to perform navigation and functions according to the instruction sets. A Y-browser instance-control module 351 is illustrated herein and adapted to provide spawning and termination control to controller 321 with regards to instances of browser 306. Module 351 may also be enabled to stall the particular instance or instances of browser 306. A status poll module 353 is illustrated herein and adapted to poll instances of browser 306 for current status information regarding respective navigation sequence. Such status results may include, but are not limited to, what operation in a sequence of operations is currently being executed, whether frames are enabled or not, whether or not functional codes, which may enhance browser function, have been downloaded from any particular web pages, and so on.

A behavior-monitoring module 355 is illustrated herein and adapted to enable controller 321 to monitor behavior of browser instances and to detect suspicious behavior. Such behavior may include but is not limited to, automated spawning of multiple instances, excessive timeouts, lack of proper controls for viewing or downloading certain content, and so on. A load-detection module 357 is illustrated and adapted to report back to controller 321 data related to current CPU load of a connected processor or processors hosting instances of browser 306. Load data indicates, for example, the amount of total cache memory available for current operations, maximum capacity for spawning instances of browser 306 per processor, and so on. Load data may also indicate areas of memory that may be purged of old data that has already been transferred to users mortuary repository on behalf of users.

Robot controller 321 may be provided as a centralized control application for controlling multiple instances of browser 306 with such instances operating on multiple processors. In another embodiment controller 321 may be provided as an individual controller bundled with an individual instance of browser 306. A software bundle comprising an instance of browser 306, APIs 307–317, and associated Java-based programs, which were described as modules in this specification, may include a standalone instance of controller 321 such that controller 321 spawns and controls a plurality of browser instances within a single bundle running on a single processor. In another embodiment more than one software bundle residing on separate processors may share a centralized instance of controller 321 running on yet another processor. In this embodiment, a single controller 321 may be adapted to control several software bundles executing on respective processors.

As previously stated, a main goal of the present invention is to provide a fully functional and truly automated navigation system that may be spawned and executed to completion based on machine-readable instruction. In a preferred embodiment instruction sets (job orders) are provided to each software bundle through a controller 321 responsible for those software bundles.

One with skill in the art will recognize that individual modules described herein as Java-based programs are included within each bundle along with an instance of browser application and associated APIs. However, this should not be regarded as a limitation of the present invention, as APIs may also be used to provide automated functionality to programs based externally from browser application 306. It will also be recognized that many functional modules are inherent in every browser application such as browser 306 as are known in prior art browser applications, but require human intervention to successfully operate and execute them in the prior art applications.

By virtue of the various APIs described in this specification, modules may be fully automated and executed from a machine-readable instruction set. It should further be recognized that many functional modules described in this specification are novel over prior art and provide enhanced browser functionality not available in prior art. It is noted herein, that many such modules were fully described in co-related cases referenced in the cross-reference section of this specification as well as in other applications filed by the inventor, which are not listed or referenced in this specification.

Provision of a software bundle of the type described in this specification provides for the first time a fully functional network-navigation system that may be spawned, executed to completion, and terminated in a truly automated fashion without requiring intervention of a user or any other human facilitation.

The method and apparatus also may be practiced in a language and platform independent manner, and be implemented over a variety of scaleable server architectures.

Automated Navigation Application

According to one aspect of the present invention, an automated navigation application is provided for enabling limited automation and task-performance functionality to desktop navigators. Such an application allows a user to log on to passworded websites and to access data with minimal or no user interaction. The methods and apparatus of the present invention are taught in enabling detail below.

Figure 20:
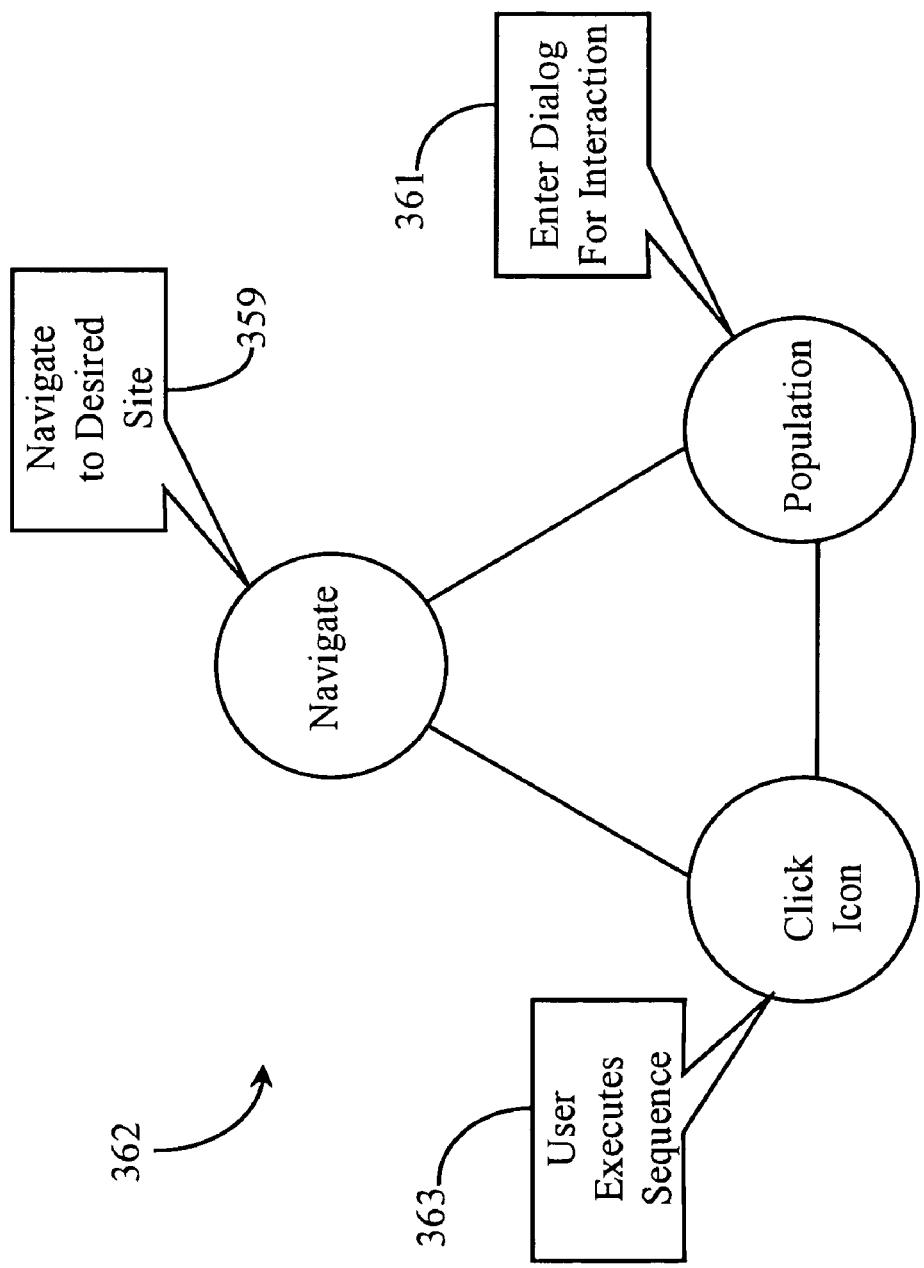
FIG. 20 is a block diagram illustrating a basic automated navigation sequence according to an embodiment of the present invention.

FIG. 20 is a block-diagram illustrating a basic automated navigation sequence according to an embodiment of the present invention. Navigation sequence 362 represents a very basic and finite navigation sequence that may be programmed using or into a desktop browser application. Sequence 362 may be executed by a one-click action initiated by a user. Sequence 362, in this example, comprises only 3 basic operations.

A first operation requires one click by a user for initiating navigation sequence 362. This action is illustrated logically herein by one of a triangular pattern of connected circles representing sequence 362. The circle just described is labeled click icon and has a function notation 363 associated therewith and labeled "User Executes Sequence". In a preferred embodiment of the present invention, an execution icon is created as a result of the creation of sequence 362. The execution icon, once created, may be provided as an addition to a browser interface, such as in a tool-bar section or as part of a drop-down menu. In this embodiment, a single icon is associated with a single navigation sequence and functions as an initiator of the sequence.

A second operation, which is automated, resulting from execution of a sequence icon is navigation itself This operation is illustrated herein by a portion of the triangle of connected circles labeled navigate and associated with a functional notation 359 labeled "Navigate to Desired Site". In this very basic example, navigation comprises navigating to a single site (URL) hosted on the operating network.

A third operation, also automated, commencing after successful navigation is represented logically by a third circle of the illustrated triangle labeled population and associated with a functional notation 361 labeled "Enter Dialog For Interaction." This operation represents a specific task performed for site access to a preprogrammed site.

As can be seen in this example, sequence 362 represents the most basic of automated navigation sequences. In actual practice however, a navigation sequence such as sequence 362 may be much more complex encompassing navigation and access to a plurality of sites where an automated interaction may be performed. Such automated interaction may include, but is not limited to, automated log-in, automated population of electronic forms, submission of such forms, performing downloads, and performing specific site-hosted functions such as viewing slideshows, playing multimedia applications, and other types of interactions.

Navigation sequence 362 is enabled by an instruction file (not shown), which may be created by a user through recording a manual sequence wherein all the desired actions are first manually performed, or by creating an instruction file using a machine-readable language that may be understood by the browser application through an application-program-interface (API). More detail regarding the methods and utilities required to create and execute an automated navigation sequence are described later in this specification.

FIGS. 21a through FIG. 21d are exemplary plan views of a PC user's display screen as may be displayed during an automated navigation sequence according to an embodiment of the present invention. Referring now to FIG. 21a, a rectangle representing the physical boundaries of a browser-display interface is illustrated and labeled with the element number 365. A sequence icon 366 is illustrated within display-interface 365. Icon 366 is a sequence-execution icon created and installed within interface 365 as a result of completion of an associated navigation sequence. In this example, icon 366 initiates execution of a navigation sequence that is associated with a users on-line banking institution. More specifically, icon 366 executes a navigation sequence that checks the current balance of the savings account belonging to the user. As such, icon 366 is labeled savings and has a $-sign included thereon as part of the icon identification. Such labels, as just described, may be created by a user during creation of navigation sequences and applied to custom icons such that specific navigation sequences are easily identifiable. Labels may include text and graphics symbols as illustrated herein.

Referring now to FIG. 21b, display-interface 365 exhibits, in this case, an exemplary Internet address WWW.MYBANK.COM, which is labeled with the element number 367. Address 367 is the network location of the web site to be accessed during the navigation sequence executed by initiating icon 366 in FIG. 21 a. Address 367 appears in the navigation-address field within display-interface 365 as it would during a normal manual sequence.

Referring now to FIG. 21 c, display-interface 365 is in the process of displaying an authentication window for enabling user-access to WWW.MYBANK.COM. A typical authentication form, labeled herein with element number 368, includes a field for entering a user name, a field for entering a password, a submit icon, and a cancel icon. Form 368 is automatically populated and submitted during the automated navigation sequence executed by icon 366 of FIG. 21a.

Referring now to FIG. 21 D, display-interface 365 is displaying a result page resulting from successful authentication represented in FIG. 21 c. A portion of this resulting page comprises a welcome message and an indication of current balance of a users savings account. Therefore, the goal of the user-created navigation sequence executed by activating icon 366 of FIG. 21 a is to navigate to and display a current balance of a particular savings account. It is noted herein, that account balance 369 may simply be included with other account balances and information provided on a single web page. Moreover, a web page containing personal account information will have a location address extended from WWW.MYBANK.COM such as, perhaps, WWW.MYBANK.COM/AUTH/PERSNLINFO.

It will be apparent to one with skill in the art that a navigation sequence such as the one executed by icon 366 of FIG. 21a may contain navigation functions and task-performance functions that are associated with a plurality of electronic information pages associated with a single site or, with a plurality of electronic information pages that represent main pages and sub pages hosted by a plurality of sites without departing from the spirit and scope the present invention. Therefore, a single navigation sequence may be programmed to navigate and perform tasks at multiple sites or at multiple pages hosted by a single site in an uninterrupted fashion from execution to end of the sequence. Furthermore, a navigation sequence may be executed during an open browser session at any point in the process thus, interrupting a manual session for purpose of performing an automated navigation sequence including automated login and limited task performance.

In the execution of an automatic navigation sequence according to an embodiment of the present invention it is not necessary that intermediate steps be displayed. In a preferred embodiment the intermediate steps, here labeled 21b and 21c, are not displayed, and take place entirely transparently to the user. The user clicks icon 366 and the result is displayed FIG. 22 is a block-diagram illustrating a functional relationship between browser-interface display 365 of FIGS. 21a through 21d and navigation-instruction files stored on a user's PC according to an embodiment of the present invention. Interface display 365 is as previously described a desktop browser interface. A separate window 375 is illustrated within interface 365 and represents a user-invoked window containing a plurality of automated navigation icons. These icons are listed from top to bottom as an icon 379 labeled Savings Account, an icon 381 labeled My Stocks, and icon 383 labeled Credit Card, and an icon 385 labeled Airline. Each icon 379–385 is an execution icon associated with a created navigation sequence as was described with respect to icon 366 of FIG. 21a. In this case, the four illustrated icons are presented in window 375 as a result of an action performed by a user such as clicking on an option from a pull-down menu.

A recording function 387 is provided within interface 365 and adapted to enable a user to record a manual navigation sequence including any manual actions performed by the user with respect to logins, downloads, hyperlink invocation, and other typical interactions. Within recording function 387, a begin function 389 is provided along with an end function 391. In a preferred embodiment of the present invention, recording function 387 is employed by a user to create and instruction file, which defines a specific navigation sequence. For example, by invoking function 389 (Begin), a user may designate the start of an automated instruction. The instruction file is defined by subsequent user navigation. When a user finishes with a manual navigation sequence, function 391 is invoked for the purpose of designating an end-point to a specific instruction file defining the sequence and being created as a result of recording.

Windows 387 and 375 may be floating windows, which remain visible within interface 365 during normal network navigation. Further illustrated, in this example, is a user PC 374 having a display monitor 373 and a processor 375. Interface 365 is logically associated with display monitor 373 by a dotted line. Therefore, it may be assumed that interface 365 is displayed on monitor 373 in this example. A hard drive 393 is logically illustrated and associated with processor 375 by a dotted line. Hard drive 393 may be a typical drive C, or a removable drive such as a Zip drive or a floppy drive. A plurality of the instruction files, listed herein as instruction files 1–4, are logically illustrated herein as resident on drive 393. Instruction files 1–4 are associated by design and function with icons 379–385.

In a preferred practice of the present invention, a user creates automated navigation sequences by first opening interface 365 while connected and in session on an applicable network such as the Internet network. Function 387 is then invoked by the initiating user. Recording function 387, as previously described, may open as a floating window. Window 387 may be preceded by an option available from a drop down menu, or by an interactive icon present within interface 365. The invocation of either of those produces window 387.

To initiate creation of an automated navigation sequence, a user invokes begin function 389 and commences a manual navigation sequence. Each action committed by a user during the manual sequence is recorded. In this way, site mapping is recorded along with the location and nature of exerted hyperlinks. Other actions and parameters such as authentication procedures, purchase order procedures, embedded media invocations and the like are similarly recorded as they occur. In addition, in some embodiments of this invention, periods of time utilized for the purpose of reading text, and viewing or listening to invoked media, as well as actual download and initialization times are recorded as they occur. These periods of time are inserted as time-outs in a created manual sequence.

When a user is finished recording a manual sequence he or she invokes end function 391, thereby defining an end point to the instruction file which will be created for that particular sequence. The instruction file represented by files 1–4 in FIG. 22 is automatically created, in a preferred embodiment, as an executable file, and is stored on drive 393. When an instruction file is created, an associated icon represented herein by icons 379–385 is also created and installed as a shortcut within interface 365, in this case, accessible through window 375.

In a preferred aspect of the invention, instruction files 1–4 and their associated icons 379–385 are all executables. That is to say that the user may launch a specific and automated navigation sequence by invoking either an instruction file or an associated icon. For example, user may simply navigate to a folder containing instruction files and invoke (click on) one of the instruction files. Upon doing so, interface 365 is launched automatically and an online connection is established. Once connected, the invoked instruction file will serve as a mini-template utilized by interface 365 for playing out the specified sequence. The same functionality may be provided through invocation of an icon wherein the icon is accessed and invoked before interface 365 is open or network connection is established. In this case, icons 379–385 may be available as shortcuts on a user desktop or in a system tray. In the example illustrated herein icons 379–385 launch automated navigation sequences after interface 365 is opened and network connection is established.

The level of functionality provided to an automated navigation sequence depends in part on the capabilities of interface 365, capabilities of software provided as an API (Bowser plug-in), and capabilities associated with any extensions or programs interfaced with the API. According to a preferred embodiment navigation-related tasks exerting hyperlinks, performing downloads, populating form fields, and launching external applications, among other tasks, are supported in a completely automated navigation sequence.

FIG. 23 is a block diagram illustrating automated navigation software 395 according to an embodiment of the present invention. SW 395 is illustrated in this example as having two basic software layers. These are a set-up layer 399 and a processing layer 397. SW 395 may be provided as a single application, which may be integrated with a standard desktop Bowser application. In another embodiment, SW 395 may be provided as a dual component comprising a browser plug-in and a desktop configuration tool.

Layer 399 is responsible for enabling a user to create custom instruction files, which serve as mini templates capable of providing a browser application with the proper instructions for performing and automated navigation sequence. Layer 397 is responsible for providing any extended functionality not already possessed by a standard browser application wherein such functions are used during automated navigation sequences.

A recording module 407 is provided within layer 399 and adapted to enable a manual navigation sequence to be completely recorded with respect to browser and user activities. Recording module 407 integrates some provided functionality with functionality already possessed by a browser application in order to provide a recorded event that may be rendered as an executable file for repeating the manual session as a fully automated session. Several variables must be considered in order that a complete recording of a manual session may be converted into an executable file. For example, the exact network path must be recorded, HTML structures and feature-locations within those structures must be understood, locations and formats of interactive forms must be understood (form population), and exact user data-input as entered in a manual session must be retained. Therefore, recording module 407 has all of the appropriate interfaces to utilities generic to a browser application and to those utilities provided for enabling extended functionality.

In one embodiment, a user may create his or her own instruction file for directing an automated navigation sequence. However, site logic and a basic understanding of XML or other applicable machine-readable languages would be required of such an individual. In a preferred embodiment, actual manual implementation of a navigation sequence is recorded then converted automatically into a usable instruction file.

A file-creation module 409 is provided within layer 399 and adapted to enable a complete rendition of a manual session to be converted into an executable instruction file. Module 409 may, in one embodiment, be enhanced such that by simply reading a manual session rendered by recording module 407, a machine-readable version (instruction file) of the session may be automatically generated. Instruction files may be generated in extensible-markup-language (XML), and in other known universal markup languages. A desktop browser then is enhanced to use the machine-readable file as an instruction template. A library of language characters may be provided as part of SW 395 for use in file generation. In some cases a proprietary version of XML or other machine-readable language is provided.

Instruction files created by module 409 are, in a preferred embodiment, stored in a secure location in memory on a user's PC. In one embodiment such files may be saved in a removable memory drive as previously described. Immediately after file creation, a user may be prompted to enter a name for the created file and to configure a look for an icon associated with the created file. Such an icon, which is analogous to icon 366 of FIG. 21 *a*, may be automatically installed in an associated browser menu or toolbar, or may be provided on a user's desktop or in a lower system tray as previously described.

An input module 411 provided within layer 399 and adapted to except additional data input from a user regarding options to add functionality to an automated routine wherein such functionality was not originally part of the routine. This particular feature provides a unique opportunity for a user and for the provider of the software. For example, the provider of the software of the present invention maintains a complete data navigation, aggregation, and summary service on behalf of subscribed users by proxy. The service, which is described in many aspects in disclosure pertaining to cross-referenced applications, maintains a database for the purpose of profiling user information, site information, and so on.

Through provision of a navigation-automation capability (SW 395) as a desktop consumable, which encompasses a scaled-down functionality from what is maintained and available at network level through subscription to the service, the service provider may create a new customer base that may be acclimated to and eventually driven to subscribe to a full proxy data-aggregation and summary service. The service provider may make some functionality immediately available through SW 395 wherein the added functionality is performed by proxy at the location of the service provider by virtue of fully automated navigation capabilities. In a case such as this, a user may be prompted through input module 411 to add such functionality into an automated sequence as desired. Added functionality may include summarizing, parsing, data-searching, solution-oriented computation, automated site registration, and other functions.

In practice of the invention as described above, a user selecting certain functionality may input the required data parameters and insert the proxy routine at a specific point within the automated navigation routine specified by the instruction file. At a specific point during subsequent execution and commencing of an automated navigation sequence, the sequence itself will stall and a call will be placed from the user station executing the sequence to a proxy navigation subsystem maintained at network level by the service provider. During this transaction, the instruction file including the selected proxy routine or request is sent over network lines to the navigation subsystem for execution and return of data. In one embodiment a user's navigator will stall until data is returned and presented to the user. In another embodiment the user's navigator may continue running its automated sequence and data return as a result of the proxy request may be transferred from the service provider to the requesting user in a call-back transaction.

In another embodiment of the present invention a user, as part of an agreement with the service provider for enabling proxy functions to be performed during automated navigation sequences executed by the user, may allow the service provider access to a secure area of memory on a user's PC hard drive, or on a removable drive for the purpose of obtaining any data or information the service provider needs for satisfying a requested proxy routine inserted into an automated navigation sequence. In this aspect, a user's station becomes a data-source entity accessible under certain circumstances to the service provider. A database containing a plurality of such entities may be likened to the operating network itself. Therefore, the service provider may manage an entire customer base for limited proxy services without formal representation of that base using additional equipment and software that would otherwise be required. Moreover, such consumers acclimated to proxy functionality and addition of sites for servicing may be eventually eased into the service provider's main portal system as hardcore subscribers.

Referring back to FIG. 23, a form population module 401 is provided within layer 397 and adapted with the functionality of automated form population using data from like form population performed manually during recording of a manual session. Module 401 may be enhanced to retrieve appropriate data from user files maintained at a user station. In this case it may be that sensitive user information is not maintained in an instruction file but a pointer to that information, which is stored elsewhere, is included therein. In another embodiment of the present invention, it may be that sensitive information is included in an instruction file but in encrypted form until actual use.

Form population module 401 represents an added functionality not available to a standard browser applications. It will be apparent to one with skill in the art that additional function modules representing other functionalities may be included within layer 397 without departing from the spirit and scope of the present invention. The inventor illustrates module 401 and deems it exemplary of one such added capability.

A mapping module 403 is provided within layer 397 and adapted to map not only network paths, but also locations within HTML structures or other data structures associated with data sources available on a network and accessible during performance of a preceding manual navigation sequence. In this example it may be assumed that module 403 is able to access and understand specific data structures representing the architectural templates of electronic information pages (Web pages) and functions embedded therein. Although module 403 is illustrated within processing layer 397, it actually functions in conjunction with module 407 illustrated within set-up layer 399. When a user is recording a manual navigation session for subsequent conversion into an instruction file, both recording and mapping may be considered processing functions. Therefore, processing layer 397 is active, in some respects, both during setup and execution of an automated navigation sequence.

An execution module 405 is provided within layer 397 and adapted as an API for linking defined execution functions made a part of a navigation sequence to appropriate execution functions existing within a standard desktop browser. Module 405 enables automated emulation of normally user-initiated functions.

It will be apparent to one with skill in the art that there may be more functional modules included within SW 395 than are illustrated herein without departing from the spirit and scope of the present invention. Provision of additional functionality, not illustrated in this example, is dependent in part on practical considerations. For example, parsing and data summarizing capabilities may be reserved for proxy services because of the complex nature of the software required to perform such tasks. However, such functions or capabilities may be included herein in limited fashion.

According to one embodiment of the present invention instruction files created by one user may be distributed to one or more peers practicing the present invention by virtue of SW 395. For example, an employer, instructor, or other individual in charge of a plurality of subordinates may create instruction files containing user names and passwords wherein such files are automatically distributed to a list of authorized subordinates upon creation. In this way the subordinates may experience a same automated navigation sequence including tasks performed. In some embodiments, this technique may be preferred over manually explaining navigation sequences to one or more individuals, or sending an end-page hyperlink.

In one embodiment of the present invention and error-correction module may be included within processing layer 397. Such a module would be used to alert a user of a status change regarding an entity included in an automated navigation sequence. For example, if there are physical or structural changes or updates performed with respect to actual network entities represented in an automated navigation sequence, the navigation sequence would stall or fail. And error-correction module maybe enhanced for incorporating moderate updates and structural changes into instruction files and enable re-execution of the automated sequences upon correction completion. In this case, the error correction module may command an additional browser window in order to access and determine current states and conditions and compare them with those existing in instruction files. In one aspect, a user may re-record a manual sequence to establish a current instruction file containing the updates.

The method and apparatus of the present invention may be practiced via private individuals on the Internet, businesses operating on a WAN connected to the Internet, businesses operating via private WAN, and so on. There are many customizable situations. The present invention as taught herein and above should be afforded the broadest of scope. The spirit and scope of the present invention is limited only by the claims that follow.

What is claimed is:

1. A system for creating and executing an automated Web browser navigation and data collection sequence comprising:
    a session recording mechanism operable by a first user for recording user Web navigation and interaction activity required for data collection associated with a manual navigation and interaction sequence comprising a plurality of web sites;
    a log-in mechanism for storing log-in information of one or more second users for individual ones of the plurality of web sites visited in the manual sequence; and
    a file creation module for converting operations recorded in the manual sequence of the first user into an executable sequence of instructions for conducting an automated sequence;
    wherein the system follows the manual sequence, creates the automated sequence, and performs the automated sequence on behalf of the second user, including logging in to individual one of the sites on behalf of the second user using the log-in information of the second user, and storing and aggregating data collected in the automated sequence and transmitting the aggregated data to the second user.

2. The system of claim 1, wherein the file-creation module includes a function for creating an executable icon for launching the automated sequence.

3. The system of claim 1, wherein the executable sequence of instructions are XML instructions.

4. The system of claim 1, wherein the automated sequence includes automation of any one of form-population, data-downloading, media-interaction, data-searching, and hyper-lining.

5. The system of claim 1, wherein the application is implemented as a browser plug-in containing a user-configuration tool.

6. The system of claim 1, wherein the automated sequence is created as a result of manual user programming instead of recording a manual sequence.

7. A method for automating Web browser navigation and data collection, comprising the steps of:
    recording user Web navigation and interaction activity for data collection, via a session recording mechanism, wherein the recording is associated with a manual navigation and interaction sequence of a first user comprising a plurality of web sites;
    storing user-entered log-in information of one or more second users for individual ones of the plurality of web sites visited in the manual sequence of the first user via a log-in mechanism;
    converting operations recorded in the manual sequence of the first user into an executable sequence of instructions for conducting an automated sequence via a file creation module;
    performing the automated sequence on behalf of the one or more second users, including logging into to individual ones of the web sites on behalf of the second user, and storing and aggregating data collected in the automated sequence; and
    transmitting the aggregated data to the one or more second users.

8. The method of claim 7, wherein the file-creation module creates an executable icon for launching the automated sequence.

9. The method of claim 7, wherein the executable sequence of instructions are XML instructions.

10. The method of claim 7, wherein the automated sequence includes automation of any one of form-population, data-downloading, media-interaction, data-searching, and hyper-linking.

11. The method of claim 7, wherein the application is implemented as a browser plug-in containing a user-configuration tool.

12. The method of claim 7, wherein the automated sequence is created as a result of manual user programming instead of recording a manual sequence.

* * * * *